(12) United States Patent
Steele et al.

(10) Patent No.: US 11,408,254 B2
(45) Date of Patent: Aug. 9, 2022

(54) ENERGY TRANSFER MECHANISM FOR WELLBORE JUNCTION ASSEMBLY

(71) Applicant: Halliburton Energy Services, Inc., Houston, TX (US)

(72) Inventors: David Joe Steele, Arlington, TX (US); Oivind Godager, Sandefjord (NO); Xiaoguang Allan Zhong, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 750 days.

(21) Appl. No.: 16/309,242

(22) PCT Filed: Dec. 19, 2017

(86) PCT No.: PCT/US2017/067295
§ 371 (c)(1),
(2) Date: Dec. 12, 2018

(87) PCT Pub. No.: WO2019/125409
PCT Pub. Date: Jun. 27, 2019

(65) Prior Publication Data
US 2021/0222520 A1  Jul. 22, 2021

(51) Int. Cl.
*E21B 41/00* (2006.01)
*H02J 50/05* (2016.01)
(Continued)

(52) U.S. Cl.
CPC .......... *E21B 41/0035* (2013.01); *E21B 23/00* (2013.01); *E21B 41/0085* (2013.01);
(Continued)

(58) Field of Classification Search
CPC .. E21B 41/0035; E21B 47/13; E21B 41/0085; E21B 23/00; H02J 50/10; H02J 50/05
See application file for complete search history.

(56) References Cited

U.S. PATENT DOCUMENTS

| 4,806,928 A | 2/1989 | Veneruso |
| 4,839,644 A | 6/1989 | Safinya et al. |

(Continued)

FOREIGN PATENT DOCUMENTS

| EP | 0678880 A1 | 10/1995 |
| RU | 2351758 C2 | 4/2009 |

(Continued)

OTHER PUBLICATIONS

US 9,306,410 B2, 04/2016, McCauley et al. (withdrawn)
(Continued)

*Primary Examiner* — Jonathan Malikasim
(74) *Attorney, Agent, or Firm* — Haynes and Boone, LLP

(57) ABSTRACT

A unitary multilateral junction for deployment in a wellbore, wherein the multilateral junction permits electrical power and communications signals to be established in both a lateral wellbore and a main wellbore utilizing capacitive coupling and a cavity resonator. The unitary junction assembly generally includes a conduit with a first upper aperture, a first lower aperture and a second lower aperture where the first lower aperture is defined at the distal end of a primary passageway extending from a conduit junction and a second lower aperture defined at the distal end of a lateral passageway extending from the conduit junction. A lower wireless energy transfer mechanism in the form of a capacitive coupler is positioned along at least one of the passageways between the distal end of the passageway and the junction. A cavity resonator is adjacent the capacitive coupler to enhance the electric field signal of the capacitive coupler.

20 Claims, 14 Drawing Sheets

(51) Int. Cl.
  *H02J 50/10* (2016.01)
  *E21B 47/13* (2012.01)
  *E21B 23/00* (2006.01)

(52) U.S. Cl.
  CPC .............. *E21B 47/13* (2020.05); *H02J 50/05* (2016.02); *H02J 50/10* (2016.02)

(56) References Cited

U.S. PATENT DOCUMENTS

| | | | |
|---|---|---|---|
| 5,008,664 | A | 4/1991 | More et al. |
| 6,070,662 | A | 6/2000 | Ciglenec et al. |
| 6,089,320 | A | 7/2000 | LaGrange |
| 6,318,457 | B1 | 11/2001 | Den Boer et al. |
| 6,378,610 | B2 | 4/2002 | Rayssiguier et al. |
| 6,390,198 | B2 | 5/2002 | Brooks et al. |
| 6,577,244 | B1 | 6/2003 | Clark et al. |
| 6,684,952 | B2 * | 2/2004 | Brockman ............ E21B 17/003 166/250.03 |
| 6,729,410 | B2 | 5/2004 | Steele |
| 6,863,129 | B2 | 3/2005 | Ohmer et al. |
| 7,104,324 | B2 | 9/2006 | Wetzel et al. |
| 7,165,618 | B2 | 1/2007 | Brockman et al. |
| 7,249,636 | B2 | 7/2007 | Ohmer |
| 7,477,160 | B2 | 1/2009 | Lemenager et al. |
| 7,497,264 | B2 | 3/2009 | Moody et al. |
| 7,834,777 | B2 | 11/2010 | Gold |
| 7,878,249 | B2 | 2/2011 | Lovell |
| 8,056,619 | B2 | 11/2011 | Patel et al. |
| 8,469,084 | B2 | 6/2013 | Clark et al. |
| 8,683,859 | B2 | 4/2014 | Godager |
| 8,701,775 | B2 | 4/2014 | Steele |
| 8,967,277 | B2 | 3/2015 | Steele et al. |
| 8,988,178 | B2 | 3/2015 | Deville et al. |
| 9,249,559 | B2 | 2/2016 | Dyer et al. |
| 9,714,567 | B2 * | 7/2017 | Godager ................ H01Q 13/08 |
| 11,203,926 | B2 * | 12/2021 | Steele ................ E21B 41/0035 |
| 2001/0025710 | A1 | 10/2001 | Ohmer |
| 2009/0080291 | A1 | 3/2009 | Tubel et al. |
| 2009/0085701 | A1 | 4/2009 | Veneruso et al. |
| 2010/0231411 | A1 | 9/2010 | Tubel |
| 2011/0011580 | A1 | 1/2011 | Clark et al. |
| 2011/0030946 | A1 | 2/2011 | Upshall |
| 2011/0100620 | A1 | 5/2011 | Patel |
| 2013/0075087 | A1 | 3/2013 | Algeroy et al. |
| 2013/0081807 | A1 | 4/2013 | Dyer et al. |
| 2013/0087321 | A1 | 4/2013 | Bartko et al. |
| 2013/0181799 | A1 | 7/2013 | Deville et al. |
| 2013/0192851 | A1 | 8/2013 | Algeroy et al. |
| 2015/0007976 | A1 | 1/2015 | Godager |
| 2015/0167452 | A1 | 6/2015 | Godager et al. |
| 2016/0145956 | A1 | 5/2016 | Dahl et al. |
| 2017/0234113 | A1 | 8/2017 | Steele |
| 2018/0010401 | A1 * | 1/2018 | Johnson ................ E21B 17/003 |
| 2018/0045020 | A1 | 2/2018 | Steele et al. |

FOREIGN PATENT DOCUMENTS

| | | |
|---|---|---|
| RU | 150456 U1 | 2/2015 |
| RU | 2588999 C2 | 7/2016 |
| WO | WO-2009126376 A2 | 10/2009 |
| WO | WO-2016007165 A1 | 1/2016 |
| WO | WO-2016018223 A1 | 2/2016 |
| WO | WO-2016043737 A1 | 3/2016 |

OTHER PUBLICATIONS

Korean Intellectual Property Office, International Search Report and Written Opinion, PCT/US2017/067295, dated Sep. 19, 2018, 15 pages, Korea.

Completion Solutions, Intelligent Completions, DataSphere™ LinX® Monitoring System, Behind Casing Reservoir Monitoring, 2017, 2 pages Halliburton, All Rights Reserved. https://www.halliburton.com/content/dam/ps/public/wd/contents/Data Sheets/web/H012113-LinX-Reservoir-Monitoring.pdf.

Completion Solutions, Intelligent Completions, DataSphere™ LinX® Monitoring System, B-Annulus Pressure/Temperature Monitoring, 2017, 2 pages Halliburton, All Rights Reserved. https://www.halliburton.com/content/dam/ps/public/wd/contents/Data Sheets/web/H012112-B-Annulus-Monitoring.pdf.

DataSphere™ LinX® Monitoring System, 1 page, Halliburton, All Rights Reserved. https://www.halliburton.com/en-US/ps/well-dynamics/well-completions/intelligent-completions/permanent-monitoring/linx.page.

L. Prebeau-Menezes, S. Mjølhus and G. Liland, World's First TAML Level-5 Multi-lateral Well with Individual Remote Inflow Control of Three Branches on Troll Oil Field, OTC 24427, Oct. 29-31, 2013, 9 pages, Offshore Technology Conference, Rio de Janeiro, Brazil.

Nakun Jing, Huilin Zhao, and Lihao Huang, A Novel Design of Planar Spiral Antenna with Metamaterial, Progress In Electromagnetics Research Symposium Proceedings, Mar. 22-26, 2010, 4 pages, Northwestern Polythechnical University, Xi'an Shaanxi, China.

Jiangpeng Liu, Yongzhi Cheng, Yan Nie, and Rongzhou Gong, Metamaterial Extends Microstrip Antenna, Dec. 2013, 4 pages, Huazhong University of Science and Technology, Department of Electronic Science & Technology, China.

Zhifeng Yaol, Mintong Lil, Chen Lin L., and Dong Wang, Microstrip Antenna Maintains Low Profile, Mar. 2014, 4 pages.

Russia Patent Office, Application No. 2020116175, Search Report, dated Nov. 26, 2020, 2 pages, Russia.

Russia Patent Office, Application No. 2020116172, Search Report, dated Dec. 14, 2020, 2 pages, Russia.

* cited by examiner

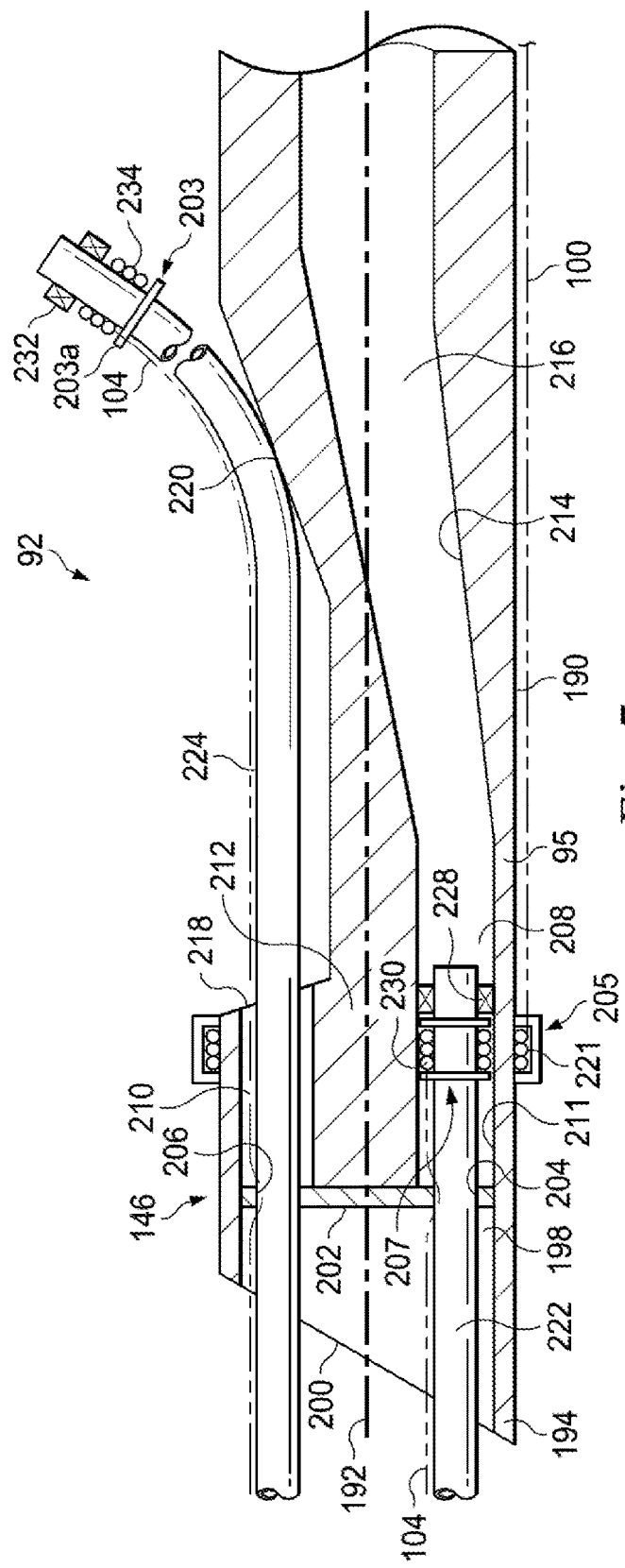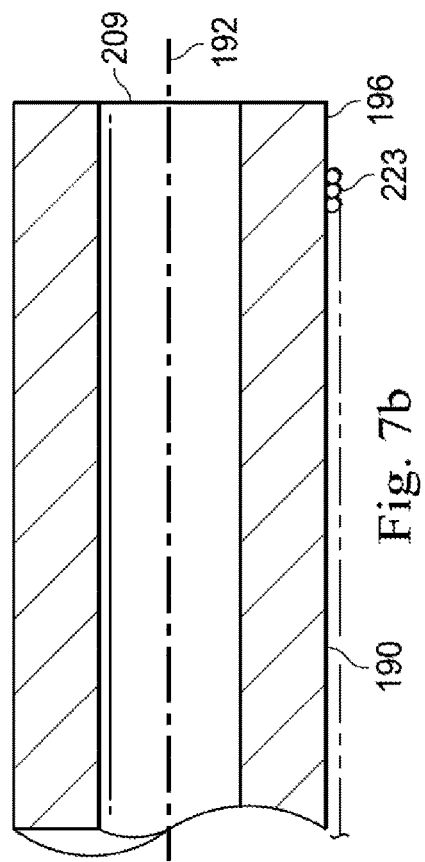
Fig. 7a
Fig. 7b

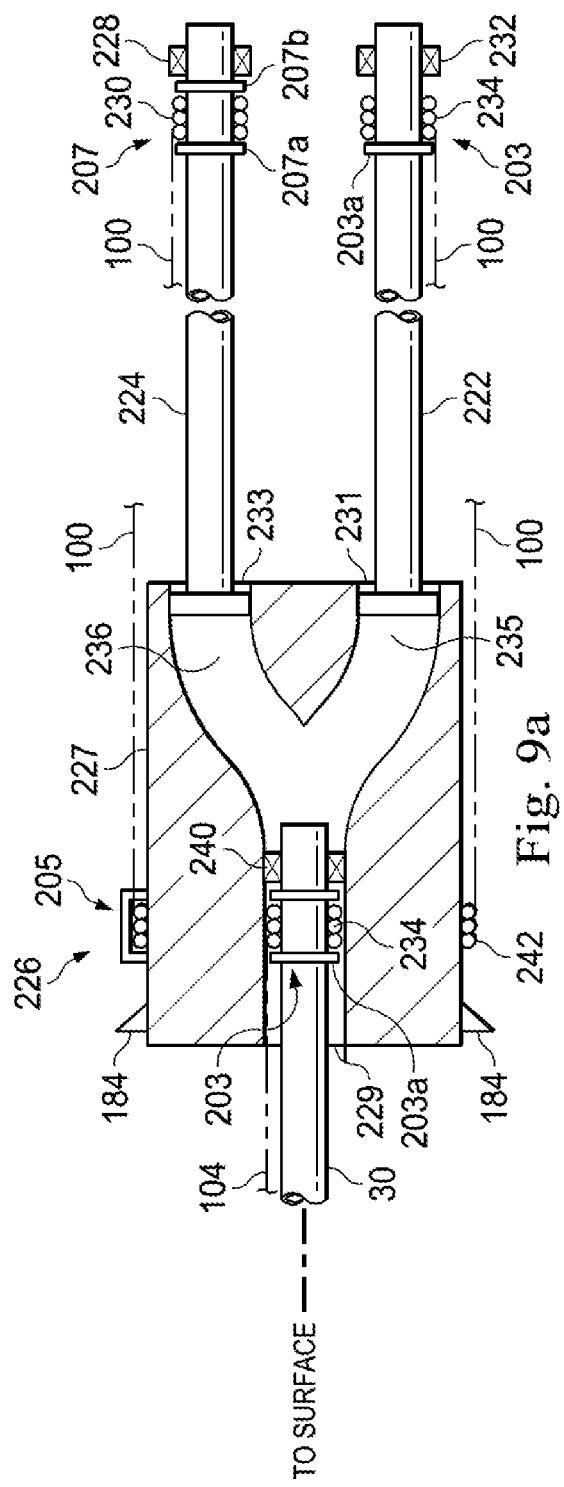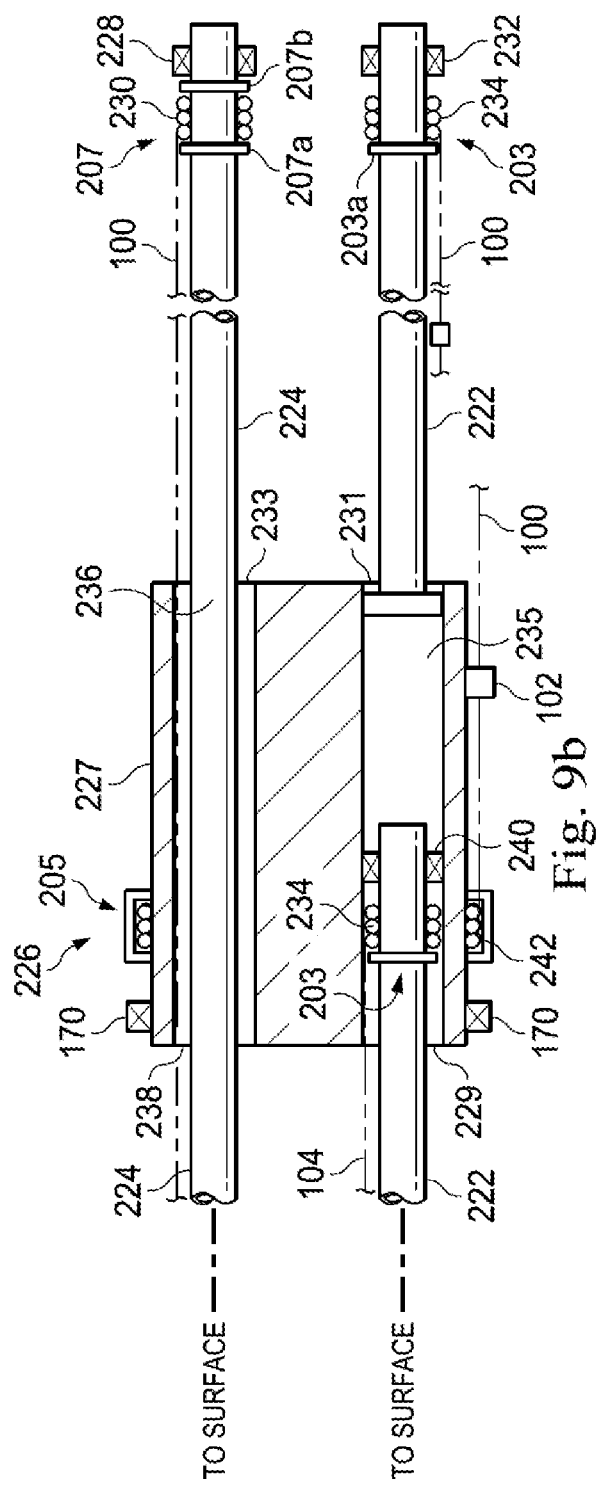

ENERGY TRANSFER MECHANISM FOR WELLBORE JUNCTION ASSEMBLY

CROSS-REFERENCE TO RELATED APPLICATIONS

This application is a U.S. national stage patent application of International Patent Application No. PCT/US2017/067295, filed on Dec. 19, 2017, the benefit of which is claimed and the disclosure of which is incorporated herein by reference in its entirety.

TECHNICAL FIELD

The present disclosure relates generally to completing wellbores in the oil and gas industry and, more particularly, to a multilateral junction that permits electrical power and communications signals to be established in both a lateral wellbore and a main wellbore utilizing capacitive coupling via a unitary multilateral junction.

BACKGROUND

In the production of hydrocarbons, it is common to drill one or more secondary wellbores (alternately referred to as lateral or branch wellbores) from a primary wellbore (alternately referred to as parent or main wellbores). The primary and secondary wellbores, collectively referred to as a multilateral wellbore may be drilled, and one or more of the primary and secondary wellbores may be cased and perforated using a drilling rig. Thereafter, once a multilateral wellbore is drilled and completed, production equipment such as production casing, packers and screens is installed in the wellbore, the drilling rig may be removed and the primary and secondary wellbores are allowed to produce hydrocarbons.

It is often desirable during the installation of the production equipment to include various electrical devices such as permanent sensors, flow control valves, digital infrastructure, optical fiber solutions, Intelligent Inflow Control Devices (ICDs), seismic sensors, vibration inducers and sensors and the like that can be monitored and controlled remotely during the life of the producing reservoir. Such equipment is often referred to as intelligent well completion equipment and permits production to be optimized by collecting, transmitting, and analyzing completion, production, and reservoir data; allowing remote selective zonal control and ultimately maximizing reservoir efficiency. Typically, communication signals and electrical power between the surface and the intelligent well completion equipment are via cables extending from the surface. These cables may extend along the interior of a tubing string or the exterior of a tubing string or may be integrally formed within the tubing string walls. However, it will be appreciated that to maintain the integrity of the well, it is desirable for a cable not to breach or cross over pressure barriers formed by the various tubing, casing and components (such as packers, collars, hangers, subs and the like) within the well. For example, it is generally undesirable for a cable to pass between an interior and exterior of a tubing string since the aperture or passage through which the cable would pass could represent a breach of the pressure barrier formed between the interior and exterior of the tubing.

Moreover, because of the construction of the well, it may be difficult to deploy a control cable from the surface to certain locations within the well. The presence of junctions between various tubing, casings and, components such as packers, collars, hangers, subs and the like, within the wellbore, particularly when separately installed, may limit the ability to extend cables to certain portions of the wellbore. This is particularly true in the case of lateral wellbores since completion equipment in lateral wellbores is installed separately from installation of completion equipment in the main wellbore. In this regard, it becomes difficult to extend cabling through a junction at the intersection of two wellbores, such as the main and lateral wellbores, because the installation of equipment into more than one wellbore requires separate trips since the equipment cannot be installed at the same time unless the equipment is small enough to fit side-by-side in the main bore while tripping in the hole. In addition, if there is more than one wellbore, the equipment would have to be spaced out precisely so that each segment of lateral equipment would be able to exit into its own lateral wellbore at the precise time the other equipment was exiting into their respective laterals, while at the same time maintaining connectivity with other locations in the wellbore.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 1c is a portion of the wellbore completion system illustrated in FIG. 1a.

FIGS. 7a and 7b illustrate cavity resonators on a unitary junction assembly.

FIGS. 9a and 9b illustrate cavity resonators on junction block assemblies utilized in wellbore completion systems.

DETAILED DESCRIPTION

Figure 1A:
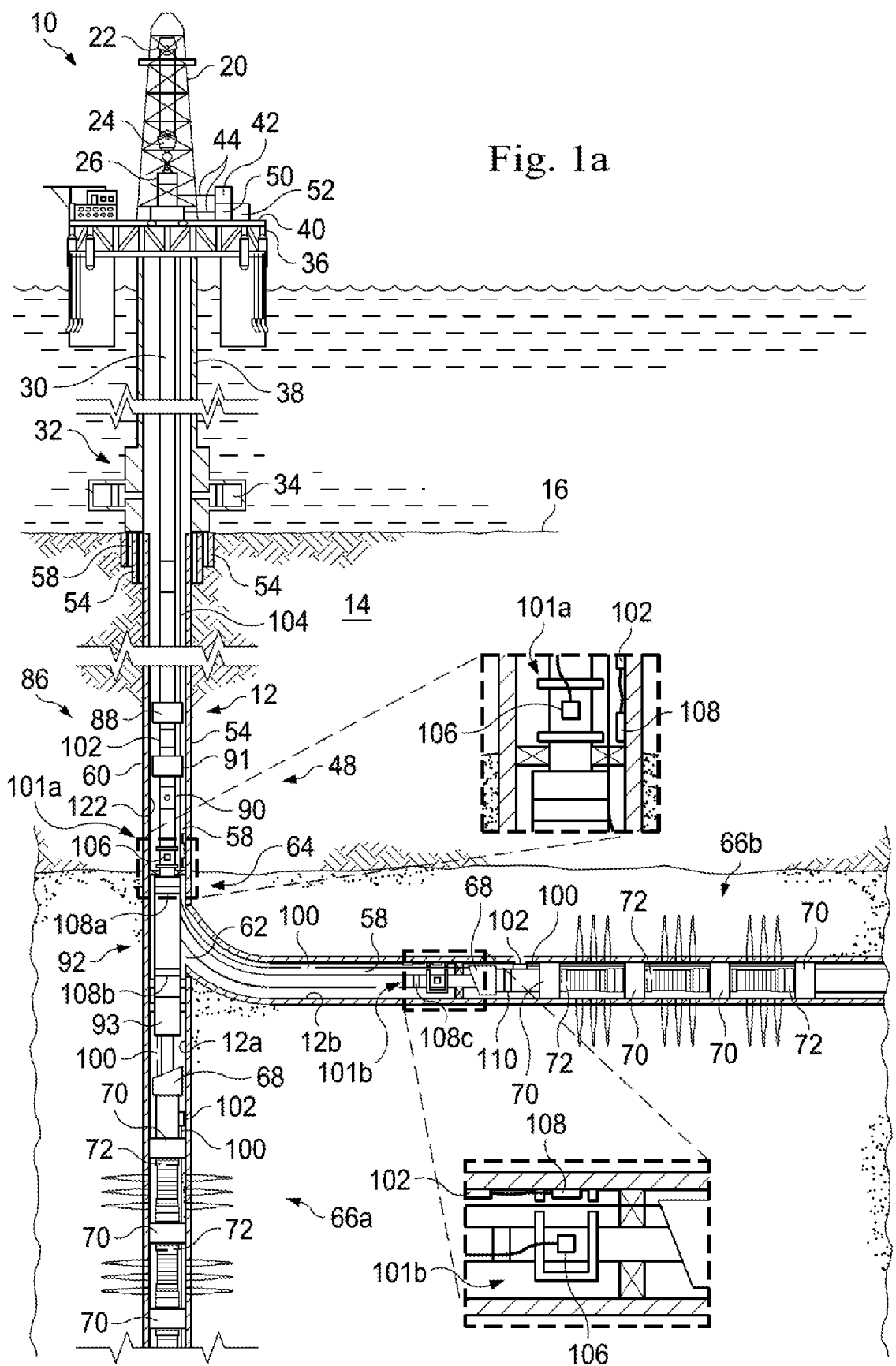
FIGS. 1a and 1b are elevation views in partial cross-section of a multilateral wellbore completion system including wireless energy transfer mechanisms and cavity resonators.

The disclosure may repeat reference numerals and/or letters in the various examples or figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the figures. For example, if an apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover, even though a figure may depict a horizontal wellbore or a vertical wellbore, unless indicated otherwise, it should be understood by those skilled in the art that the apparatus according to the present disclosure is equally well-suited for use in wellbores having other orientations including, deviated wellbores, multilateral wellbores, or the like. Likewise, unless otherwise noted, even though a figure may depict an offshore operation, it should be understood by those skilled in the art that the apparatus according to the present disclosure is equally well-suited for use in onshore operations and vice-versa.

Generally, a multilateral wellbore system is provided for placement at branch junctions within wellbores. The system comprises a junction assembly having a conduit with a first upper aperture, a first lower aperture and a second lower aperture, where the first lower aperture is defined at a distal end of a primary leg extending from a conduit junction and the second lower aperture is defined at a distal end of a lateral leg extending from the conduit junction. Preferably, the junction assembly is a unitary assembly and at least one of the legs is deformable. Carried on a first tubular in the multilateral wellbore system is a first wireless energy transfer mechanism ("WETM") and carried on a second tubular concentric with the first tubular is a second WETM. At least one of the WETMs is disposed within the cavity of a cavity resonator to enhance wireless signal propagation between the first and second WETMs when they are adjacent one another. In some embodiments, the first and second WETMS and cavity resonator are deployed in conjunction with the junction assembly to minimize the need for wet connections across the junction assembly. In this regard, a junction assembly may include an upper energy transfer mechanism (ETM) mounted on the conduit between the first upper aperture and the conduit junction. The junction assembly may include at least a first lower WETM mounted on one of the legs between the junction and the lower aperture. The WETM is comprised of an electric-field ("E-field") antenna or transceiver disposed within the cavity of a cavity resonator carried on the leg. The cavity resonator may be uni-directional or omni-directional and is configured to focus an E-field emanating from the antenna towards an E-field antenna or transceiver mounted on an adjacent downhole structure. Preferably, the junction assembly includes a lower WETM mounted on each of the primary and lateral legs. The WETM may be in electrical communication with the upper ETM. The antenna or transceiver of the WETM in each case may be a capacitive coupler coil or segment disposed to wirelessly transfer energy and signals to another capacitive coupler coil when positioned adjacent one another as aided by the resonator. The signals may be control, data or other types of communication signals. In the case of a unitary junction assembly, the unitary nature of junction assembly permits the upper ETM to be in wired communication with one or both of the lower WETMs without the need for connectors therebetween as would be the case with multi-piece junction assemblies assembled downhole at the wellbore junction.

Figure 1B:
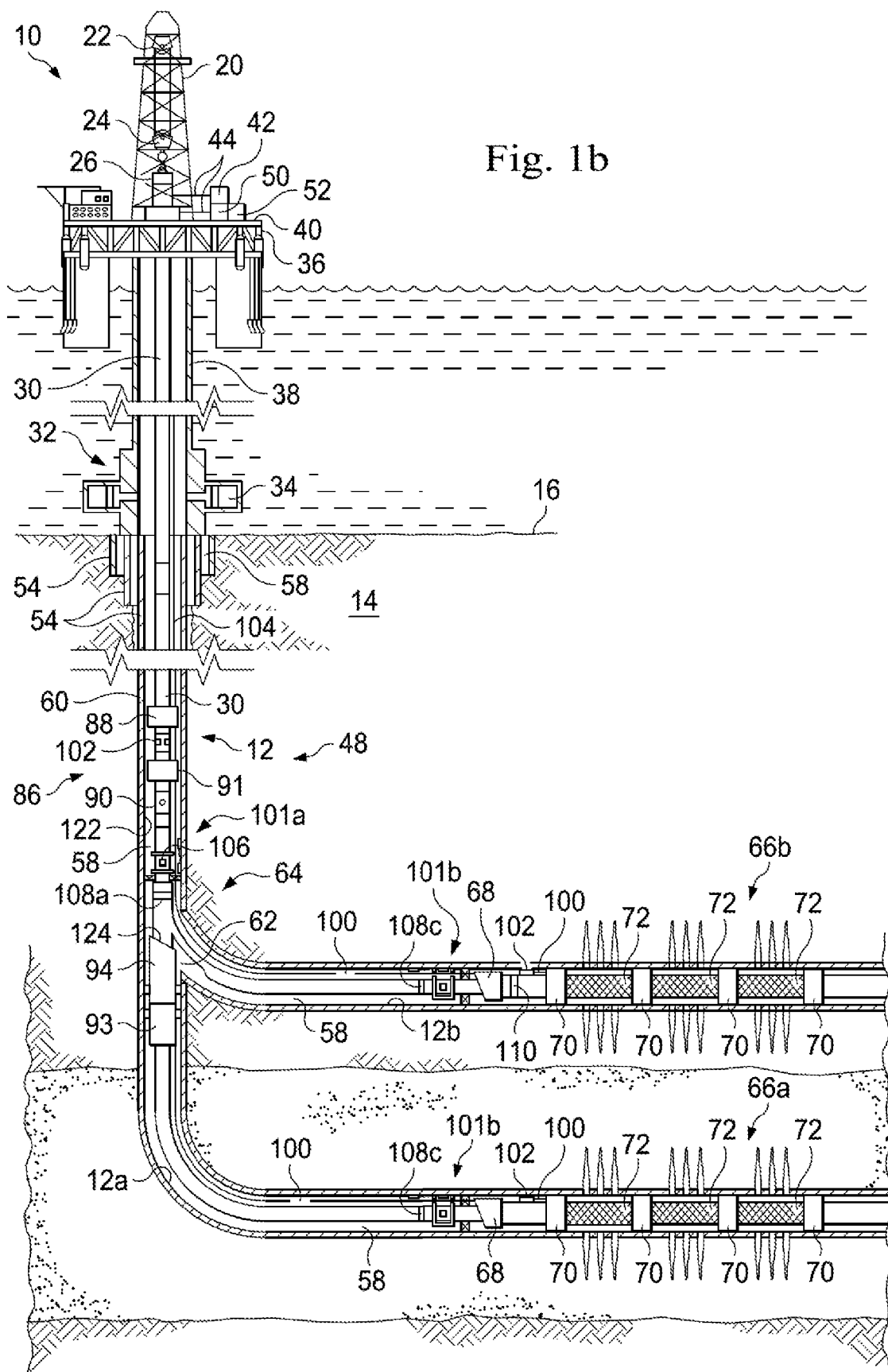

Turning to FIGS. 1a and 1b, shown is an elevation view in partial cross-section of a multilateral wellbore completion system 10 utilized to complete wells intended to produce hydrocarbons from wellbore 12 extending through various earth strata in an oil and gas formation 14 located below the earth's surface 16. Wellbore 12 is formed of multiple bores, extending into the formation 14, and may be disposed in any orientation, such as lower main wellbore 12a and lateral wellbore 12b illustrated in FIGS. 1a and 1b.

Completion system 10 may include a derrick or rig 20. Rig 20 may include a hoisting apparatus 22, a travel block 24, and a swivel 26 for raising and lowering casing, drill pipe, coiled tubing, production tubing, work strings or other types of pipe or tubing strings, generally referred to herein as string 30. In FIGS. 1a and 1b, string 30 is substantially tubular, axially extending production tubing supporting a completion assembly as described below. String 30 may be a single string or multiple strings as discussed below.

Rig 20 may be located proximate to or spaced apart from wellhead 32, such as in the case of an offshore arrangement as shown in FIGS. 1a and 1b. One or more pressure control devices 34, such as blowout preventers (BOPS) and other equipment associated with drilling or producing a wellbore may also be provided at wellhead 32 or elsewhere in the system 10.

For offshore operations, as shown in FIGS. 1a and 1b, rig 20 may be mounted on an oil or gas platform 36, such as the offshore platform as illustrated, semi-submersibles, drill ships, and the like (not shown). Although system 10 of FIGS. 1a and 1b is illustrated as being a marine-based multilateral completion system, system 10 of FIGS. 1a and 1b may be deployed on land. In any event, for marine-based systems, one or more risers or subsea conduits 38 extend from deck 40 of platform 36 to a subsea wellhead 32. Tubing string 30 extends down from rig 20, through subsea conduit 38 and BOP 34 into wellbore 12.

A working or service fluid source 42, such as a storage tank or vessel, may supply, via flow lines 44, a working fluid (not shown) pumped to the upper end of tubing string 30 and flow through string 30 to equipment disposed in wellbore 12, such as subsurface equipment 48. Working fluid source 42 may supply any fluid utilized in wellbore operations, including without limitation, drilling fluid, cement slurry, acidizing fluid, liquid water, steam or some other type of fluid. Production fluids, working fluids, cuttings and other debris returning to surface 16 from wellbore 12 may be directed by a flow line 44 to storage tanks 50 and/or processing systems 52, such as shakers, centrifuges, other types of liquid/gas separators and the like.

Figure 1C:
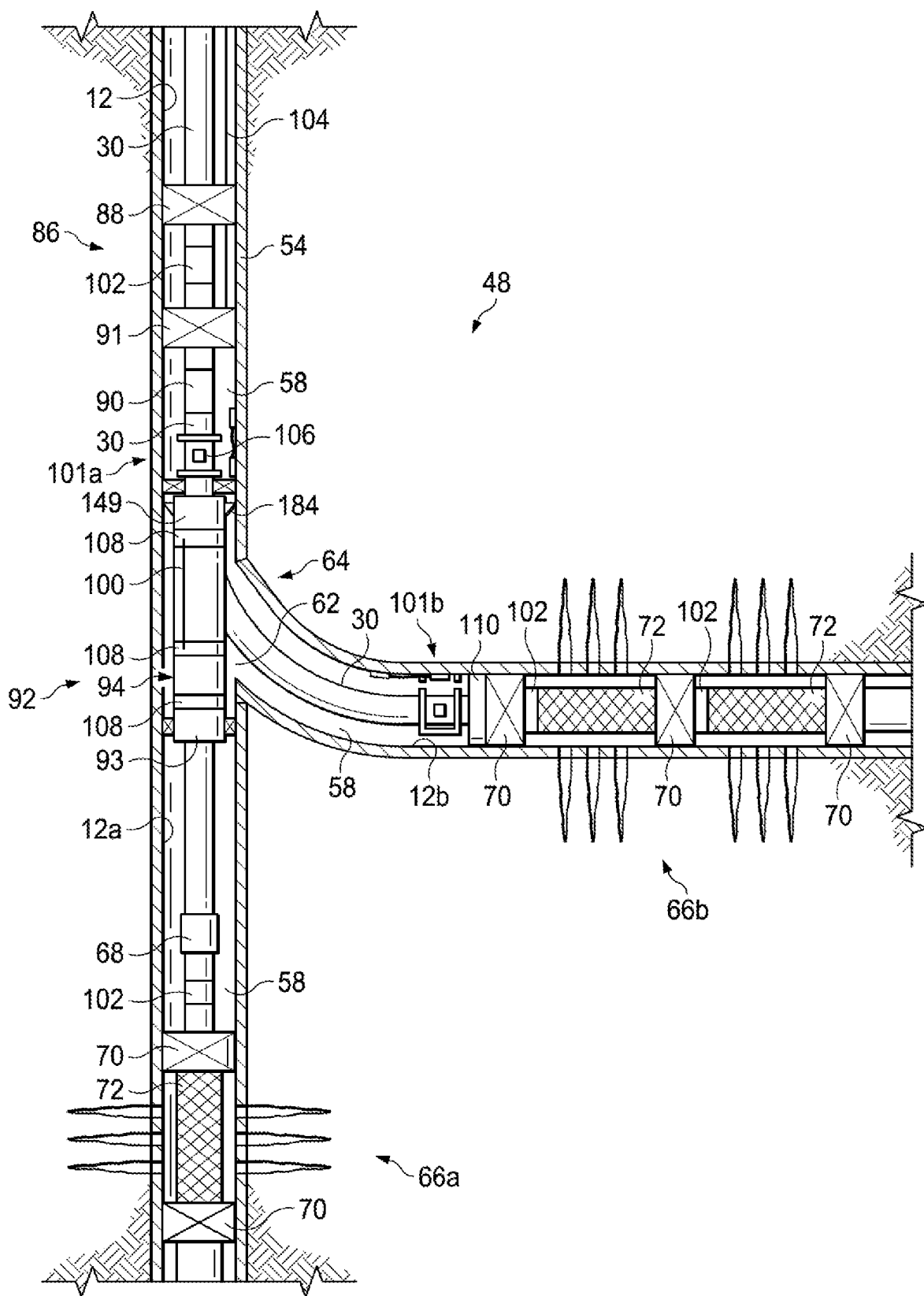

With reference to FIG. 1c and ongoing reference to FIGS. 1a and 1b, all or a portion of the wellbore 12 is lined with liner or casing 54 that extends from the wellhead 32; casing 54 may include the surface, intermediate and production casings as shown in FIGS. 1a and 1b. Casing 54 may be comprised of multiple strings with lower strings extending from or otherwise hung off an upper string utilizing a liner hanger 184. For purposes of the present disclosure, these multiple strings will be jointly referred to herein as the casing 54. An annulus 58 is formed between the walls of sets of adjacent tubular components, such as concentric casing strings 54; or the exterior of string 30 and the inside wall of a casing string 54; or the wall of wellbore 12 and a casing string 54, as the case may be. For outer casing 54, all or a portion of the casing 54 may be secured within the wellbore 12 by depositing cement 60 within the annulus 58 defined between the casing 54 and the wall of the wellbore 12. In some embodiments, the casing 54 includes a window 62 formed therein at the intersection 64 between lower main wellbore 12a and a lateral wellbore 12b.

As shown in FIGS. 1a, 1b and 1c, subsurface equipment 48 is illustrated as completion equipment and tubing string 30 in fluid communication with the completion equipment 48 is illustrated as production tubing 30. Although completion equipment 48 can be disposed in a wellbore 12 of any orientation, for purposes of illustration, completion equipment 48 is shown disposed in each of the lower main wellbore 12a, and a substantially horizontal portion of lateral wellbore 12b. Completion equipment 48 may include a lower completion assembly 66 having various tools, such as an orientation and alignment subassembly 68, one or more packers 70 and one or more sand control screen assemblies 72. Lower completion assembly 66a is shown disposed in lower main wellbore 12a, while lower completion assembly 66b is shown disposed in lateral wellbore 12b. It will be appreciated that the foregoing is simply illustrative and that lower completion assembly 66 is not limited to particular equipment or a particular configuration.

Disposed in wellbore 12 at the lower end of tubing string(s) 30 is an upper completion assembly 86 that may include various equipment such as packers 88, flow control modules 90 and electrical devices 102, such as sensors or actuators, computers, (micro) processors, logic devices, other flow control valves, digital infrastructure, power source, optical fiber, Intelligent Inflow Control Devices (ICDs), seismic sensors, vibration inducers and sensors and the like. To the extent separate tubing strings 30 extend from the surface 16 to upper completion assembly 86, then one tubing string may communicate with lower main wellbore 12a, while another tubing string (see FIG. 9b) may communicate with lateral wellbore 12b, thereby segregating the production from each wellbore 12a, 12b. In such case, packer 88 may be a dual bore packer.

At the intersection 64 of the lower main wellbore 12a and the lateral wellbore 12b is a junction assembly 92 which may engage a location mechanism 93 secured within lower main wellbore 12a. The location mechanism 93 serves to support the junction assembly 92 at a desired vertical location within casing 54, and may also maintain the junction assembly 92 in a predetermined rotational orientation with respect to the casing 54 and the window 62. Location mechanism 93 may be any device utilized to vertically (relative to the primary axis of lower main wellbore 12a) secure equipment within lower main wellbore 12a, such as a latch mechanism. In one or more embodiments, junction assembly 92 is a deformable junction that generally comprises a deformable, unitary conduit 96 (see FIG. 3). In one or more embodiments, junction assembly 92 may be a rigid conduit 95 (see FIG. 7a). In embodiments of junction assembly 92 where junction assembly 92 is a deformable junction that comprises a deformable conduit 96, the junction assembly 92 may be deployed with a deflector 94 (see FIG. 2) which may be disposed to engage the location mechanism 93. In other embodiments, junction assembly 92 may comprise deflector 94. Junction assembly 92 generally permits communication between the upper portion of wellbore 12 and both the lower main wellbore 12a and the lateral wellbore 12b. In this regard, junction assembly 92 may be in fluid communication with upper completion assembly 86. In one or more embodiments, junction assembly 92 is a unitary assembly in that it is installed as a single, assembled component or otherwise, integrally assembled before installation at intersection 64. Such a unitary assembly, as will be discussed in more detail below, permits capacitive coupling communication to both the lower main wellbore 12a and the lateral wellbore 12b without the need for wet connections or physical couplings, while at the same time minimizing the sealing issues prevalent in the prior art as explained below.

Any one of the components within wellbore 12, including without limitation, upper completion assembly 86, junction assembly 92, location mechanism 93, packer 88 or tubing string 30, may also include an energy transfer mechanism (ETM) 91, which may be wired energy transfer mechanism such as a wet connect electrical receptacle, or a wireless energy transfer mechanism (WETM) such as a capacitive coupler segment, e.g., coils or an antenna. In the case of a WETM, although the disclosure contemplates any WETM utilized to wirelessly transfer power and/or communication signals, in specific embodiments, the WETMs discussed herein may be E-field antennas, capacitive coupler coils or other electric components which are deployed in conjunction with a cavity resonator 101 as shown in FIG. 1a and as discussed in more detail below. For purposes of illustration, a WETM may be referred to herein generally as an E-field antenna, or vice-versa, but will be understood to include capacitive coupler coils or other electric components capable of generating an E-field. It will be appreciated that the ETMs generally, and WETMs specifically, may be used for a variety of purposes, including but not limited to transferring energy, gathering data from sensors, communicating with sensors or other electrical devices, controlling electric devices along the length of the lateral completion assembly, charging batteries, long-term storage capacitors or other energy storage devices deployed downhole, powering/controlling/regulating ICDs, etc. In one or more embodiments, ETM 91 is in electrical communication with packer 88 and/or flow control modules 90 and/or electrical devices 102 or may otherwise comprise electrical devices 102. ETM 91 may be integrally formed as part of packer 88 or flow control module 90, or separate therefrom. ETM 91 may be an E-field antenna 91, in which case, it may be deployed in conjunction with a cavity resonator 101 (e.g., 101a, 101b).

In some embodiments, the junction assemblies 92 described herein are unitary in nature. Such unitary junction assemblies 92 minimizes the likelihood that debris within the wellbore fluids will inhibit sealing at the junction 64. Commonly, wellbore fluid has 3% or more suspended solids, which can settle out in areas such as junction 64 causing the seals in the area to be in-effective. Because of this, prior art junctions installed in multiple pieces or steps, cannot readily provide reliable high-pressure containment (>2,500-psi, for example) and wireless power/communications simultaneously. Debris can become trapped between components of the prior art multi-part junctions as they are assembled downhole, jeopardizing proper mating and sealing between components. Further drawbacks can be experienced to the extent the multi-part junctions are non-circular, which is a common characteristic of many prior art junction assemblies. In this regard, a multi-part junction which requires the downhole assembly (or engagement) of non-circular components is prone to leakage due to 1) the environment and 2) inability to remove debris from the sealing areas. The typical downhole environment where a multi-piece junction is assembled is contaminated with drilling solids suspended in the fluid. In addition, the multi-piece junction is assembled in a location where metal shavings are likely to exist from milling a window (hole) in the side of the casing. The metal shavings can fall out into the union of the mainbore casing and the lateral wellbore. This area is large and non-circular which makes it very difficult to flush the shavings and drill cuttings out of the area. Furthermore, the sealing areas of a multi-part junction are not circular (non-circular) which prevents the sealing areas from being fully "wiped cleaned" to remove the metal shavings and drill cuttings prior to engagement of the seals and the sealing surfaces. In addition, the sealing surfaces may contain square shoulders, channels, and/or grooves which further inhibits cleaning of all of the drilling debris from them. Notably, in many cases, because of the non-circular nature of the components between which a seal is to be established, traditional elastomeric seals may not be readily utilized, but rather, sealing must be accomplished with metallic sealing components such as labyrinth seals. As is known in the industry labyrinth seals typically do not provide the same degree of sealing as elastomeric seals. Moreover, being made of metal interleaved surfaces, the seal components will be difficult to clean prior to engagement with one another.

In contrast, a unitary junction assembly 92 as described herein is assembled on the surface in a clean environment so that all sealed connections can be inspected, cleaned prior to assembly and then pressure-tested before being run into the well. Moreover, the unitary junction assembly 92 eliminates the need for labyrinth seals as found in the prior art junction assemblies. Extending along each of lower completion assemblies 66a, 66b is one or more electrical control lines or cables 100 mounted along either the interior or exterior of lower completion assembly 66. Control lines 100 may pass through packers 70 and may be operably associated with one or more electrical devices 102 of the lower completion assembly 66. Electrical devices 102 may include sensors or actuators, controllers, computers, (micro) processors, logic devices, other flow control valves, digital infrastructure, optical fiber, ICDs, seismic sensors, ETMs, WETMs, vibration inducers and sensors and the like, as well as other WETMs. Control lines 100 may operate as communication media, to transmit power, or data and the like between a lower completion assembly 66 and an upper completion assembly 86 via junction assembly 92. Data and other information may be communicated using electrical signals or other telemetry that can be converted to electrical signals to, among other things, monitor and control the conditions of the environment and various tools in lower completion assembly 66 or other tool string.

Extending uphole from upper completion assembly 86 are one or more electrical control lines 104 which extend to the surface 16. Control lines 104 may be electrical, hydraulic, optic, or other lines. Control lines 104 may operate as communication media, to transmit power, signals or data and the like between a controller, commonly at or near the surface (not shown), and the upper and lower completion assemblies 86, 66, respectively.

Carried on production tubing 30 is an ETM 106 as will be described in more detail below, with a control line 104 extending from ETM 106 to surface 16. In one or more embodiments, ETM 106 is a WETM, and may be in the form of an E-field antenna 106. In such case, deployed on tubing string 30 adjacent WETM 106 is a cavity resonator 101a. In other embodiments, ETM 106 is a wet connect energy transfer mechanism and is used to couple power and communications to a WETM further downhole.

In one or more embodiments, deployed in association with junction assembly 92 is at least one WETM 108. WETM 108 may be mounted along junction assembly 92 either internally or externally, with one or more control lines 100 extending from WETM 108. A cavity resonator 101 may be deployed on junction assembly 92 adjacent WETM 108. In one or more embodiments, junction assembly 92 may include an upper ETM 108a, which is preferably in the form of a WETM and disposed to wirelessly couple with a WETM 106 carried on tubing 30.

In other embodiments, upper ETM 108a is a wet connect energy transfer mechanism disposed to engage a similar ETM 106 carried on production tubing 30. In such case, upper ETM 108a is in wired communication with a WETM 108 further downhole in at least one wellbore 12, and preferably for each of the lower main wellbore 12a and the lateral wellbore 12b, junction assembly 92 may include ETMs 108b, 108c as shown in FIG. 1a. ETMs 108b, 108c may be WETMs, in wired electrical communication with upper ETM 108, all carried on junction assembly 92. In other embodiments, ETM 108 is a wired connector and in wired electrical communication with at least one, and preferably both ETMs 108b, 108c. In such case, one or both ETMs 108b, 108c maybe E-field antennas. For each such E-field antenna disposed to communicate with another E-field antenna, at least one of the two E-field antennas to be in communication with one another is deployed in conjunction with an adjacent cavity resonator 101, such as cavity resonators 101a, 101b.

Finally, at least one ETM 110, and preferably a WETM such as coils or an E-field antenna, may be deployed in lateral wellbore 12b in association with lower completion assembly 66b. To the extent ETM 110 is a WETM, ETM may be an E-field antenna and may be deployed in conjunction with a cavity resonator 101, as shown. It will be appreciated that when two WETMs are adjacent one another and at least one WETM is partially bounded by a cavity resonator 101, (such as is shown in FIG. 1a), wireless coupling between adjacent WETMS can enhance wireless transfer between the adjacent WETMs of power and/or monitoring and control signals. In some embodiments, both WETMs that are adjacent one another are deployed in association with a cavity resonator 101 or otherwise the cavity resonator 101 includes a portion disposed about each WETM, preferably so that the adjacent cavity resonators or portions open towards one another. While in some embodiments, the two aligned WETMs are on opposite sides of a pressure barrier (such as within the interior of a pressure conduit and on the exterior of a pressure conduit), in other embodiments, the two WETMs may be on the same side of a pressure conduit, simply permitting a connector-less coupling for transmission of power and/or signals.

Figure 2:
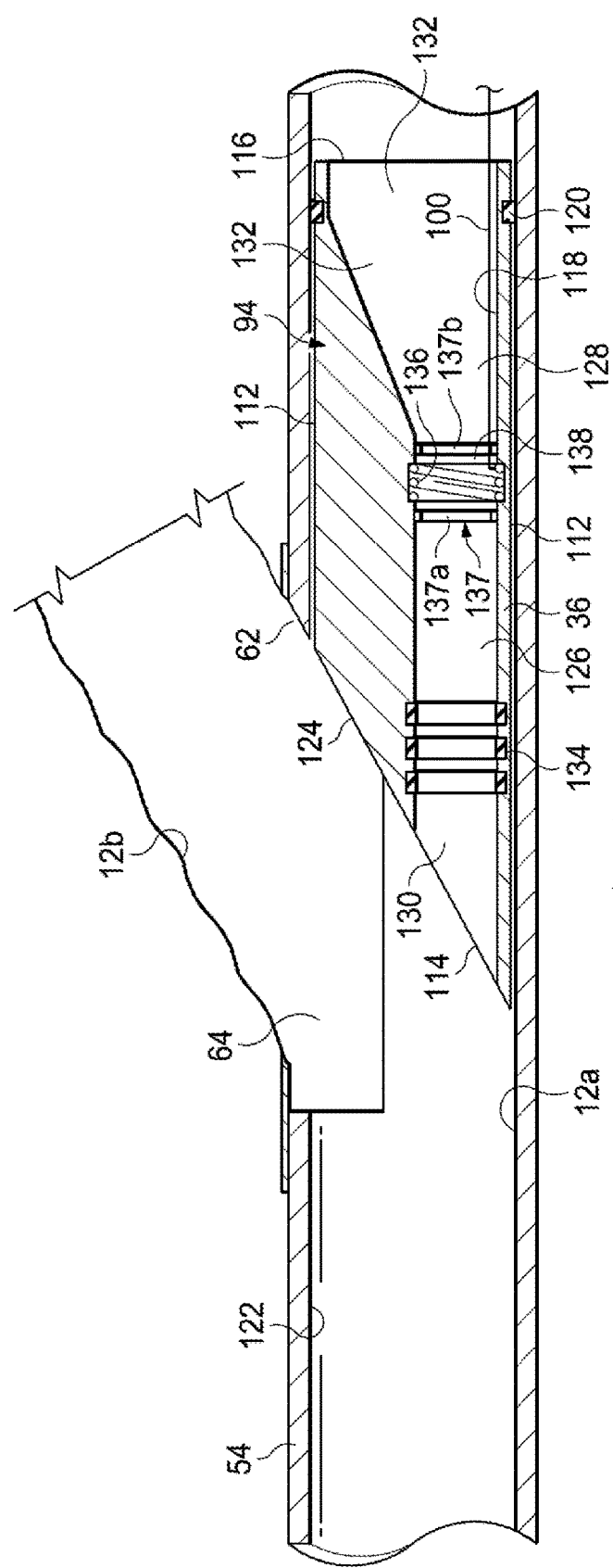
FIG. 2 illustrates a cavity resonator on a deflector deployed in a wellbore completion system.
Figure 3:
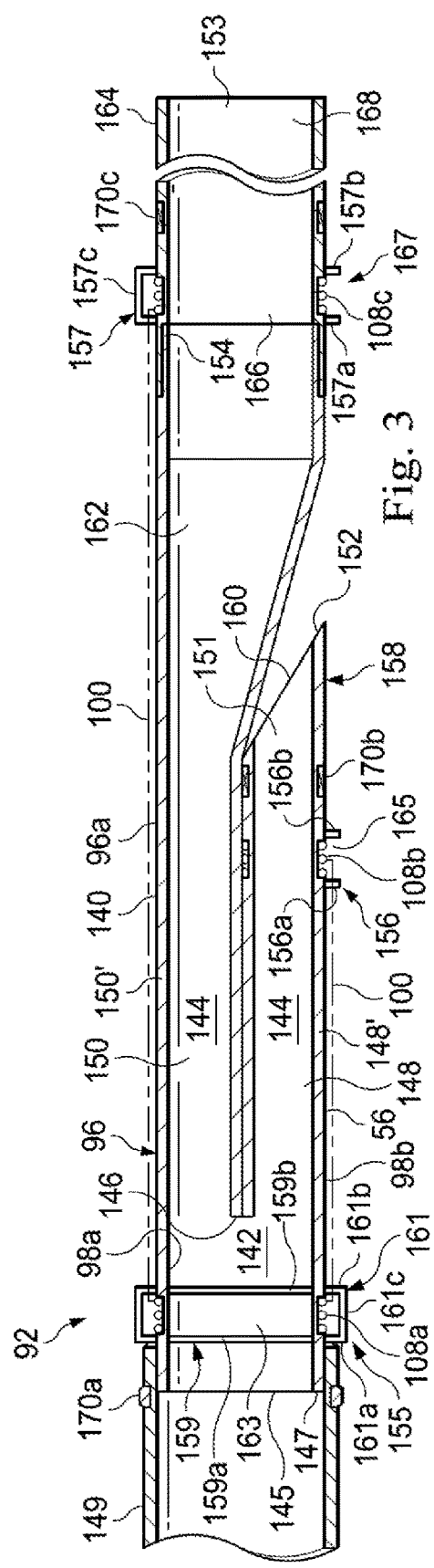
FIG. 3 illustrates a cavity resonators on a deformable unitary junction assembly deployed in a wellbore completion system.
Figure 4:
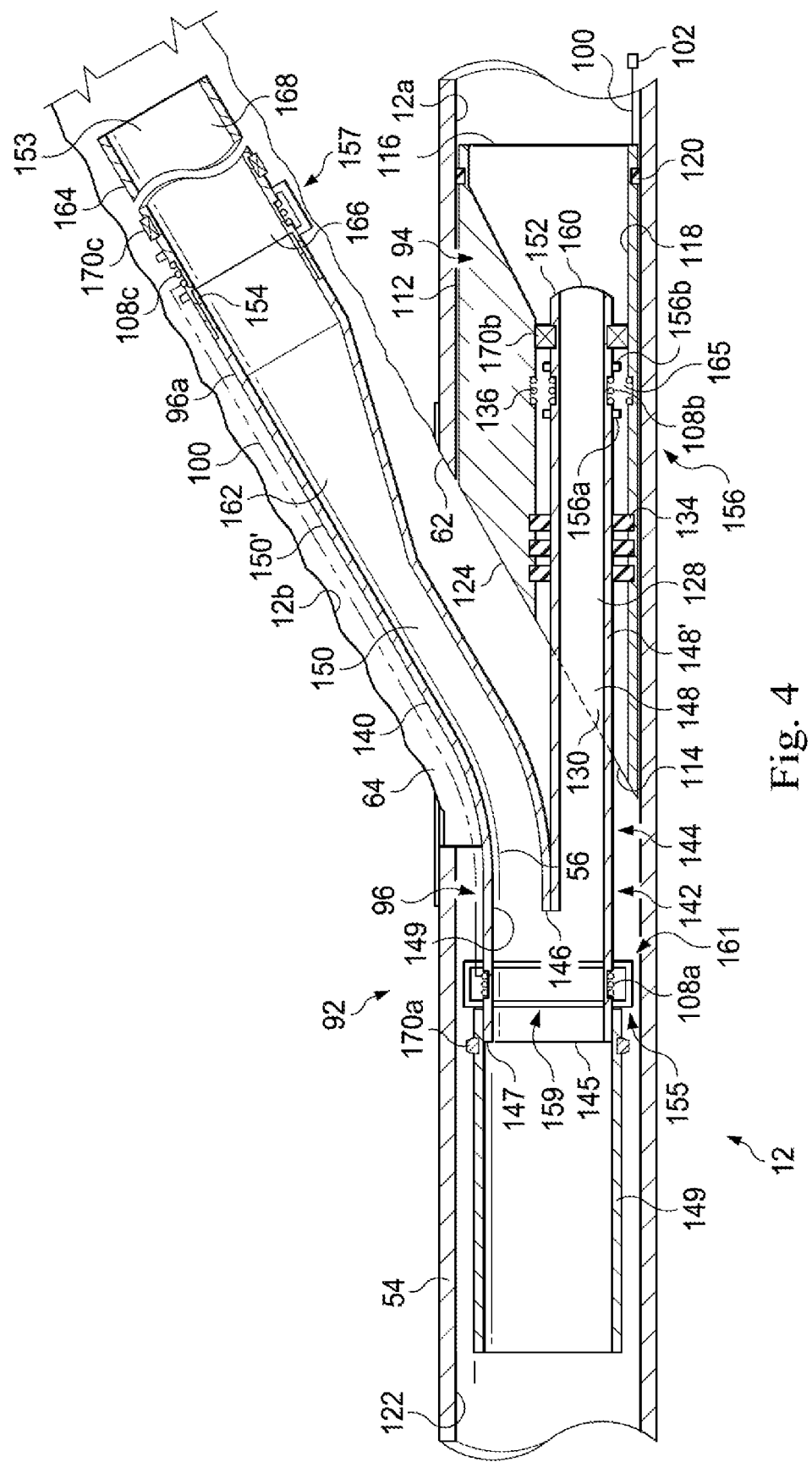
FIG. 4 illustrates the deflector and junction assembly of FIGS. 2 and 3 aligned with one another in a wellbore completion system.

Turning to FIGS. 2, 3 and 4, embodiments of unitary junction assembly 92 having a deformable conduit 96 are illustrated and generally include (a) an upper section for attachment to a pipe string and having a first upper aperture; (b) a lower section comprising a primary passageway ending in a first lower aperture for fluid communication with a deflector and a secondary passageway ending in a second lower aperture for fluid communication with the secondary wellbore; and (c) a deformable portion. One or more of the passageways may be formed along a leg whereby the conduit is separated into the primary leg and the secondary leg, thereby forming a unitary multilateral junction, the unitary nature of which permits junction assembly 92 to be installed as a single unit that can more readily be used to transfer power and/or communication signals to both the lower main wellbore 12a and the lateral wellbore 12b. The deformable portion may be a leg or conduit junction located between the upper section and the lower section of the conduit.

The embodiments of junction assembly 92 illustrated in FIGS. 2, 3 and 4 may be deployed in conjunction with a deflector 94 which may be used to position junction assembly 92. With specific reference to FIGS. 2 and 4, deflector 94 is positioned along casing 54 adjacent the intersection 64 between the lower main wellbore 12a and lateral wellbore 12b. In particular, the deflector 94 is located distally to the intersection 64, adjacent or in close proximity to it, such that when equipment is inserted through the wellbore 12, the equipment can be deflected into the lateral wellbore 12b at the intersection 64 as result of contact with the deflector 94. The deflector 94 may be anchored, installed or maintained in position within the lower main wellbore 12a using any suitable conventional apparatus, device or technique.

The deflector 94 has an external surface 112, an upper end 114, a lower end 116 and an internal surface 118. The external surface 112 of the deflector 94 may have any shape or configuration so long as the deflector 94 may be inserted in the lower main wellbore 12a in the manner described herein. In one or more embodiments, the external surface 112 of the deflector 94 is preferably substantially tubular or cylindrical such that the deflector 94 is generally circular on cross-section.

In preferred embodiments, the deflector 94 may include a seal assembly 120 positioned along external surface 112 to provide a seal between the external surface 112 of the deflector 94 and the internal surface 122 of the casing 54 of wellbore 12. Thus, wellbore fluids are inhibited from passing between the deflector 94 and the casing 54. As used herein, a seal assembly, such as seal assembly 120, may be any conventional seal or sealing structure. For instance, a seal assembly such as seal assembly 120 may be comprised of one or a combination of elastomeric or metal seals, packers, slips, liners or cementing. Likewise, a seal assembly such as seal assembly 120 may also be a sealable surface. Seal assembly 120 may be located at, adjacent or in proximity to the lower end 116 of the deflector 94.

The deflector 94 further comprises a deflecting surface 124 located at the upper end 114 of the deflector 94 and a seat 126 for engagement with the junction assembly 92. When positioned in the lower main wellbore 12a, as shown in FIG. 2, the deflecting surface 124 is located adjacent the lateral wellbore 12b such that equipment inserted through the wellbore 12 may be deflected into the lateral wellbore 12b to the extent the equipment cannot pass through deflector 94 as described below. The deflecting surface 124 may have any shape and dimensions suitable for performing this function, however, in preferred embodiments, the deflecting surface 124 provides a sloped surface which slopes from the upper end 114 of the deflector 94 downwards, towards the lower end 116 of the deflector 94.

The seat 126 of the deflector 94 may also have any suitable structure or configuration capable of engaging the junction assembly 92 to position or land the junction assembly 92 in the lower main and lateral wellbores 12a, 12b in the manner described herein. In the preferred embodiment, when viewing the deflector 94 from its upper end 114, the seat 126 is offset to one side opposite the deflecting surface 124.

Further, in the preferred embodiment, the deflector 94 further comprises a deflector bore 128 associated with the seat 126. The deflector bore 128 is associated with the seat 126, which engages the junction assembly 92, in a manner such that the movement of fluids in the wellbore 12 through the deflector 94 and through the junction assembly 92 is facilitated.

The deflector bore 128 extends through the deflector 94 from the upper end 114 to the lower end 116. The deflector bore 128 preferably includes an upper section 130, adjacent the upper end 114, communicating with a lower section 132, adjacent the lower end 116. Preferably, the seat 126 is associated with the upper section 130. Further, in the preferred embodiment, the seat 126 is comprised of all or a portion of the upper section 130 of the deflector bore 128. In particular, the upper section 130 is shaped or configured to closely engage the junction assembly 92 in the manner described below. The bore of the lower section 132 of the deflector bore 128 preferably expands from the upper section 130 to the lower end 116 of the deflector 94. In other words, the cross-sectional area of the lower section 132 increases towards the lower end 116. Preferably, the increase in cross-sectional area is gradual and the cross-sectional area of the lower section 132 adjacent the lower end 116 is as close as practically possible to the cross-sectional area of the lower end 116 of the deflector 94.

Disposed along bore 128 is a seal assembly 134. Seal assembly 134 may be any conventional seal assembly. For instance, the seal assembly 134 may be comprised of one or a combination of seals and sealing surfaces or friction fit surfaces. In one or more embodiments, seal assembly 134 is located along the internal surface 118 in upper section 130 of the deflector 94.

Deflector 94 further includes an ETM 136, and preferably, a WETM 136, mounted thereon. In one or more embodiments, WETM 136 is may be coils, an antenna or other capacitive coupler segments, and for purposes of this discussion, without intending to limit the WETM 136. While WETM 136 may be mounted internally or externally along deflector 94, in one or more embodiments, WETM 136 is deployed internally along bore 128. In one or more embodiments, WETM 136 is mounted upstream of seals 134 between seals 134 and upper end 114 such that a cable 100 extending down from deflector 94 to lower completion assembly 66a passes through seal 134. Likewise, in one or more preferred embodiments, capacitive segment 136 is mounted downstream of seals 134 between seals 134 and lower end 116 so that a cable 100 extending down from deflector 94 to lower completion assembly 66a does not interfere with seal 134. In this regard, WETM 136 is preferably located below seat 126.

Finally, deflector 94 may include a cavity resonator disposed adjacent a WETM carried by deflector 94. For example, in FIGS. 2 and 4, WETM 136 is illustrated. Shown adjacent WETM 136 is a cavity resonator 137 having a first radially extending wall 137a and a second radially extending wall 137b spaced apart from first wall 137a and bounding WETM 136 so as to form a cavity 138 with WETM 136 disposed at least partially within cavity 138.

Referring to FIGS. 3 and 4, junction assembly 92 may be comprised of a conduit 96 having a deformable portion 96a with an outside surface 140 as described below. In some embodiments, the conduit 96 is generally tubular or cylindrical in shape such that the conduit 96 is generally circular on cross-section and defines an outside diameter. In some embodiments, conduit 96 may have a D-shaped cross-section, while in other embodiments, conduit 96 may have other cross-sectional shapes. Conduit 96 includes an upper section 142, a lower section 144 and a conduit junction 146. In one or more embodiments, the conduit junction is the deformable portion, while in other embodiments, the conduit junction is rigid and one or both of the conduit legs is deformable. The upper section 142 is comprised of a proximal end 147 opposing the conduit junction 146 with a first upper aperture 145 defined in the upper section 142. Thus, the upper section 142 extends from the junction 146, in a direction away from the lower section 144, for a desired length to the proximal end 147. In addition, the upper section 142 may further include a polished bore receptacle (PBR) 149, either integrally formed or secured to proximal end 147. The junction assembly 92 may include a liner hanger 184 (FIG. 1c) in combination with the conduit 96 to support the conduit in the wellbore 12. The junction assembly 92 may include seals 170, such as upper seal 170a, above or below WETM 108a.

In one or more embodiments, the conduit 96 is unitary. In this regard, conduit 96 may be integrally formed, in that the upper section 142, the lower section 144 and the conduit junction 146 are comprised of a single piece or structure. Alternately, the conduit 96, and each of the upper section 142, the lower section 144 and the conduit junction 146, may be formed by interconnecting or joining together two or more pieces or portions that are assembled into a unitary structure prior to deployment in wellbore 12.

The lower section 144 is comprised of (i) a primary leg 148 having a wall 148', the primary leg 148 extending from the conduit junction 146 and (ii) a secondary or lateral leg 150 having a wall 150', the lateral leg 150 extending from the conduit junction 146. The primary leg 148 is capable of engaging the seat 126 of the deflector 94, while the lateral leg 150 is capable of being inserted into the lateral wellbore 12b. The conduit junction 146 is located between the upper section 142 and the lower section 144 of the conduit 96 comprising the junction assembly 92, whereby the conduit 96, and in particular the lower section 144, is separated or divided into the primary and lateral legs 148, 150.

The primary leg 148 has a distal end 152 opposing the conduit junction 146 with a first lower aperture 151 defined at the distal end 152. Thus, the primary leg 148 extends from the conduit junction 146, in a direction away from the upper section 142 of the conduit 96, for a desired length to the distal end 152 of the primary leg 148. In the preferred embodiment, the primary leg 148 is tubular or hollow such that fluid may be conducted between the first upper aperture 145 of the upper section 142, past the conduit junction 146 to the first lower aperture 151 of the distal end 152. Thus, fluid may be conducted through the lower main wellbore 12a by passing through the conduit 96 of the junction assembly 92 and the deflector bore 128 of the deflector 94.

The secondary or lateral leg 150 also has a distal end 154 opposing the junction 146 with a second lower aperture 153 defined at the distal end 154. Thus, the secondary leg 150 extends from the conduit junction 146, in a direction away from the upper section 142 of the conduit 96, for a desired length to the distal end 154 of the secondary leg 150. The secondary leg 150 is tubular or hollow for conducting fluid between the first upper aperture 145 of the upper section 142, past the conduit junction 146 to the second lower aperture 153 of the distal end 154. In the illustrated embodiment, lateral leg 150 is deformable. In other embodiments, both of legs 148, 150 may be deformable.

As used herein, "deformable" means any pliable, movable, flexible or malleable conduit that can be readily manipulated to a desired shape. The conduit may either retain the desired shape or return to its original shape when the deforming forces or conditions are removed from the conduit. For example, lateral leg 150 is movable or flexes relative to primary leg 148 due to conduit junction 142.

As described above, junction assembly 92 may include two or more ETMs, some of which may take the form of a WETM. In the embodiment shown in FIGS. 3 and 4, junction assembly 92 further includes first, second and third WETMs 108a, 108b and 108c. First WETM 108a is preferably positioned along upper section 142 between proximal end 147 and conduit junction 146. Second WETM 108b is positioned along primary leg 148 between conduit junction 146 and distal end 152, while third WETM 108c is positioned along secondary leg 150 between conduit junction 146 and distal end 154. In the case of second and third WETMs 108b and 108c, the WETMs are preferably positioned adjacent the distal end 152, 154, respectively, of the primary leg 148 and secondary leg 150. Likewise, in the case of the first, second and third WETMs 108a, 108b and 108c, they may be positioned either along the interior or exterior of junction assembly 92. In FIGS. 3 and 4, first, second and third WETMs 108a, 108b and 108c are illustrated as being positioned along the exterior of junction assembly 92. As illustrated, a cable 100 extends from first WETM 108a down to each of the second and third WETMs 108b and 108c. Because junction assembly 92 is unitary in nature, it allows first WETM 108a to be readily connected to both the second and third WETMs 108b and 108c since the interconnections need not bridge separately installed components as would commonly occur in the prior art with multi-piece junction assemblies.

In any event, as shown in FIG. 4, primary leg 148 may be of any length permitting the primary leg 148 to engage the seat 126 (FIG. 2) of the deflector 94 and WETM 108b to be positioned in the vicinity of, and generally aligned with, WETM 136 of deflector 94. In this regard, WETMs 136 and 108b may be on the same side of a pressure barrier, and thus, adjacent one another, or separated by a pressure barrier, and thus, simply aligned with one another. In any event, the secondary leg 150 may be of any length permitting the secondary leg 150 to be deflected into the lateral wellbore 12b. Further, the primary and secondary legs 148, 150 may be of any lengths relative to each other. However, in the preferred embodiment, the secondary leg 150 is longer than the primary leg 148 such that the distal end 154 of the secondary leg 150 extends beyond the distal end 152 of the primary leg 148 when the conduit junction 146 is substantially undeformed.

With respect to the alignment of WETMs, it will be understood that communicating WETMs may require axial alignment, circumferential alignment or both to enhance communication therebetween. To further enhance communication between adjacent WETMs, a cavity resonator may be disposed adjacent a WETM carried by junction assembly 92. For example, in FIGS. 3 and 4, an upper cavity resonator 155 is shown deployed in conjunction with WETM 108a, while a first lower cavity resonator 156 is shown deployed in conjunction with WETM 108b and a second lower cavity resonator 157 is shown deployed in conjunction with WETM 108c. As with all cavity resonators described herein, cavity resonators 155, 156, 157 may take different shapes and forms so long as they provide the function of focusing and guiding the E-field towards the desired WETM. Thus, upper cavity resonator 155 is shown as including a first portion 159 extending around the inner surface 98a of upper section 142 and a second portion 161 extending around the exterior surface 98b of upper section 142. First portion 159 is further formed of a first inner radially extending wall 159a spaced apart from a second inner radially extending wall 159b on opposing sides of WETM 108a so as for form a cavity 163 therebetween. Walls 159a, 159b may take various forms. In one embodiment walls 159a, 159b may be inner lips or protrusions extending partially or fully around the inner circumference of upper section 142. Likewise, second portion 161 is formed of a first outer radially extending wall 161a spaced apart from a second outer radially extending wall 161b and joined by an additional wall 161c so as to enclose WETM 108a. Although not limited in this regard, in the illustrated embodiment, first and second outer radially extending walls 161a, 161b may extend partially or fully around the outer circumference of upper section 142. Likewise, wall 161c may extend partially around the upper section 142 or fully around upper section 142, so as to be tubular in shape.

First lower cavity resonator 156 is shown as simply a first outer radially extending wall 156a spaced apart from a second outer radially extending wall 156b on opposing sides of WETM 108b so as for form a cavity 165 therebetween.

Second lower cavity resonator 157 is shown as a first outer radially extending wall 157a spaced apart from a second outer radially extending wall 157b on opposing sides of WETM 108c, with an additional wall 157c joining walls 157a and 157b and extending only partially around the circumference of lateral leg 150 so as to form a partial enclosure or cavity 167 about WETM 108c.

In one or more preferred embodiments, when the secondary leg 150 is in a substantially undeformed position as shown in FIG. 3, the primary leg 148 and the secondary leg 150 are substantially parallel to each other. However, the primary and secondary legs 148, 150 need not be substantially parallel to each other, and the longitudinal axes of the primary and secondary legs 148, 150 need not be substantially parallel to the longitudinal axis of the conduit 96, as long as the conduit 96 may be inserted and lowered into wellbore 12 when the secondary leg 150 is in a substantially undeformed position.

When the junction assembly 92 is connected to a pipe string 30 and lowered in wellbore 12, the secondary leg 150 is capable of being deflected into the lateral wellbore 12b by the deflector 94 such that the deformable conduit junction 146 becomes deformed and the primary leg 148 then engages the seat 126 of the deflector 94, as shown in FIG. 4. The deformable conduit junction 146 separates the primary leg 148 and the secondary leg 150 and permits the placement of the junction assembly 92 in the main and lateral wellbores 12a, 12b, respectively.

As stated, the primary leg 148 is capable of engagement with the seat 126 of the deflector 94. Thus, the shape and configuration of the primary leg 148 is chosen or selected to be compatible with the seat 126, being the upper section 130 of the deflector bore 128 in the preferred embodiment.

Further, the seat 126 engages the primary leg 148 such that the movement of fluid in the lower main wellbore 12a, through the deflector 94 and the conduit 96, is facilitated. Preferably, the primary leg 148 engages the seat 126 to provide a sealed connection between the deflector 94 and the wellbore 12. Any conventional seal assembly 134 may be used to provide this sealed connection. For instance, the seal assembly 134 may be comprised of one or a combination of seals or a friction fit between the adjacent surfaces. In the preferred embodiment, the seal assembly 134 is located between the primary leg 148 and the upper section 130 of the deflector bore 128 when the primary leg 148 is seated or engages the seat 126. The seal assembly 134 may be associated with either the primary leg 148 or the upper section 130 of the deflector bore 128. However, preferably, the seal assembly 134 is associated with the upper section 130 of the deflector bore 128.

Primary leg 148 may include a guide 158 for guiding the primary leg 148 into engagement with the seat 126. The guide 158 may be positioned at any location along the length of the primary leg 148 which permits the guide 158 to perform its function. However, preferably, the guide 158 is located at, adjacent or in proximity to the distal end 152 of the primary leg 148. The guide 158 may be of any shape or configuration capable of guiding the primary leg 148. However, preferably the guide 158 has a rounded end 160 to facilitate transmission down the wellbore 12, as shown in FIG. 4.

When primary leg 148 is seated in deflector 94 as described above, WETM 108b carried on primary leg 148 is positioned in the vicinity of WETM 136 of deflector 94 so as to permit wireless engagement between the WETMs 108b, 136. Moreover, second lower cavity resonator 156 is positioned to enhance transmission of signals between WETMs 108b, 136.

The secondary leg 150 may include an expansion section 162 located at, adjacent or in proximity to the distal end 154 of the secondary leg 150. The expansion section 162 comprises a cross-sectional expansion of the secondary leg 150 in order to increase its cross-sectional area. As indicated above, the length of the secondary leg 150 is greater than the length of the primary leg 148 in the preferred embodiment. Preferably, the secondary leg 150 commences its cross-sectional expansion to form the expansion section 162 at a distance from the conduit junction 146 approximately equal to or greater than the distance of the distal end 152 of the primary leg 148 from the conduit junction 146. Thus, when the conduit junction 146 is undeformed, the expansion section 162 is located beyond or distal to the distal end 152 of the primary leg 148 as shown in FIG. 3.

A liner 164 for lining the lateral wellbore 12b may extend from conduit 96. The liner 164 may be any conventional liner, including a perforated liner, a slotted liner or a prepacked liner. In one or more embodiments, the liner 164 may form part of the lower completion assembly 66b in lateral wellbore 12b, while it in other embodiments, liner 164 may be a separate and generally in fluid communication with conduit 96. In any event, liner includes a proximal end 166 and a distal end 168, where the proximal end 166 is attached to the distal end 154 of the secondary leg 150. The distal end 168 extends into the lateral wellbore 12b such that all or a portion of the lateral wellbore 12b is lined by the liner 164. Thus, junction assembly 92 may function to hang the liner 164 in the lateral wellbore 12b. Alternatively, as discussed below, a stinger 172 (see FIG. 5), may be attached to the distal end 154 of secondary leg 150 and utilized to transport liner 164 and/or other components of a lower completion assembly 66 (see FIG. 5, e.g., 66a, 66b) into lateral wellbore 12b.

The upper section 142 conducts fluid therethrough from the deformable conduit junction 146 to the proximal end 147. In the preferred embodiment, the upper section 142 permits the mixing or co-mingling of any fluids passing from the primary and secondary legs 148, 150 into the upper section 142. However, alternately, the upper section 142 may continue the segregation of the fluids from the primary and secondary legs 148, 150 through the upper section 142.

Figure 5:
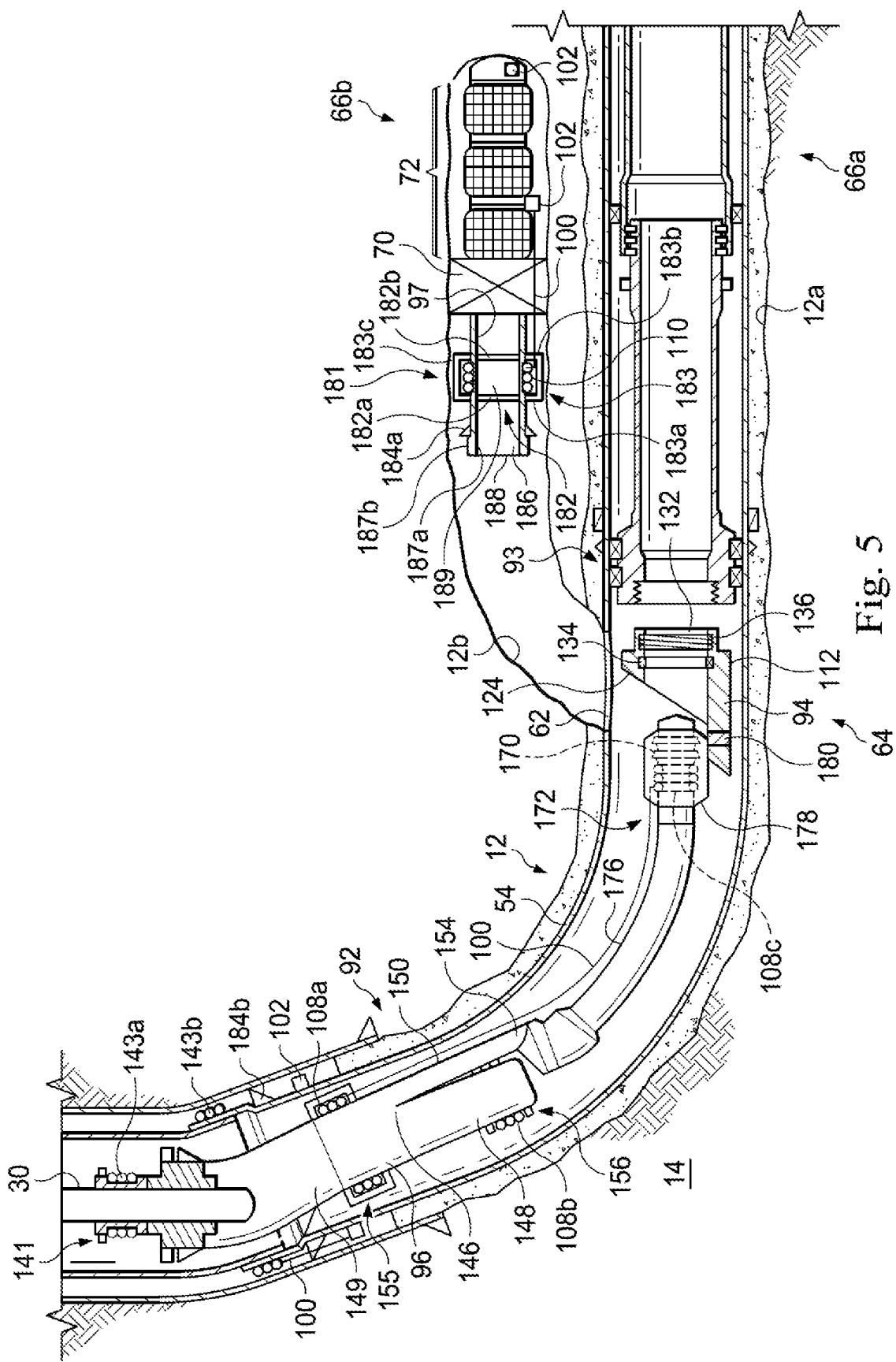
FIG. 5 illustrates the deployment of a deformable unitary junction assembly having a cavity resonator.

Thus, the fluids are not permitted to mix or co-mingle in the upper section 142. Junction assembly 92 may also include one or more seal assemblies 170 (e.g., 170a, 170b, 170c) associated with it. Seal assemblies 170 may be carried on conduit 96 or may be carried on adjacent equipment, such as a liner hanger (see liner hanger 184b in FIG. 5) supporting junction assembly 92. As illustrated a seal assembly 170a is associated with the upper section 142 of the conduit 96, or may form or comprise a portion thereof, such that the seal assembly 170a provides a seal between the conduit 96 and casing 54 within wellbore 12. Seal assembly 170a may be carried on conduit 96 such as shown in FIGS. 3 and 4, or some other adjacent equipment, such as shown in FIG. 5, but is generally provided to seal the upper section 142 of junction assembly 92. Preferably, the seal assembly 170a is located between the outside surface 140 of the upper section 142 of the conduit 96 (other liner hanger 184, as the case may be) and the internal surface 122 of casing 54. Thus, seal assembly 170a inhibits wellbore fluids from passing between the conduit 96 and the casing string 54.

A seal assembly 170b is shown positioned along primary leg 148, preferably adjacent distal end 152, and a seal assembly 170c is shown positioned along secondary leg 150, preferably adjacent distal end 154. The seal assembly 170 may be comprised of any conventional seal or sealing structure. For instance, the seal assembly 170 may be comprised of one or a combination of seals, packers, slips, liners or cementing.

In one or more embodiments, where WETMs that are cabled to one another are positioned so that consecutive WETMs are on the same tubular, such as WETMs 108 illustrated on conduit 96, and are within the same pressure barrier, it may be desirable to position the WETMs between sets of sealing elements, such as seal assemblies 170a and 170b. This prevents the need for a cable, such as cable 100, from straddling or extending across a pressure barrier. As used herein, pressure barrier may refer to a wall between an interior and exterior of a tubular, such as a string or casing, or may refer to a zone defined by successive sets of seal assemblies along a tubular.

In one or more embodiments where cooperating WETMs, i.e., WETMs disposed to wirelessly transfer power and/or signals therebetween, are positioned adjacent one another within the same pressure barrier (as opposed to simply aligned on opposite sides of a tubing wall), it may be necessary for a cable 100 extending to one of the WETMs to pass through a pressure barrier, such as a seal assembly, in order to electrically connect via cable 100 respective electrical components. For example, in FIG. 4, primary leg 148 of a junction assembly 92 is inserted into bore 128 of deflector 94. As shown, the WETM 136 carried by deflector 94 is adjacent WETM 108b carried by junction assembly 92. Because the WETMs 136, 108b are within the same pressure barrier, the cable 100 extending from one of the WETMs 136, 108b must extend through or around a seal assembly, such as is shown where cable 100 extending from WETM 136 to a downhole electrical device 102 passes through seal assembly 134 of deflector 94. In another embodiment, cable 100 may pass from the internal surface 118 to the external surface 112 of deflector 94 and then extend downhole along the external surface 112 of deflector 94.

Alternatively, it will be appreciated, that WETM 136 may be located on the external surface 112 of deflector 94 and simply aligned with WETM 108b positioned on junction assembly 92 within the interior of deflector 94. In such case, no such pressure barrier need be crossed, and cable 100 may extend downhole to an electrical device 102 positioned within the pressure barrier of WETM 136.

As best illustrated in FIG. 5, in one or more embodiments, junction assembly 92 may include a stinger 172 attached to the distal end 154 of secondary leg 150. In such case, the third WETM 108c of secondary leg 150 may be carried on stinger 172. More generally in FIG. 5, a lower completion assembly 66a is illustrated deployed in the lower main wellbore 12a, while a lower completion assembly 66b is illustrated deployed in a lateral wellbore 12b. Although lower completion assemblies 66 as described herein are not limited to a particular configuration, for purposes of illustration, lower completion assembly 66b is shown as a tubular 97 having one or more sand control screen assemblies 72 and one or more packers 70 extending from a liner or hanger 184a, with a bore 186 formed within tubular 97. Lower completion assembly 66b, and tubular 97 in particular, may also include at its proximal end 188 a polished bore receptacle, such as PBR 149 shown in FIG. 4.

Moreover, each lower completion assembly 66 may include a WETM associated with the respective lower completion assembly 66. As illustrated, lower completion assembly 66b includes a WETM 110 associated with it. In particular, WETM 110 is deployed along lower completion assembly 66b adjacent proximal end 188 for alignment with WETM 108c as described below. In one or more embodiments, to enhance transmissions to or from WETM 110, a cavity resonator 181 may be disposed adjacent WETM 110 carried by lower completion assembly 66b. Lower completion cavity resonator 181 is shown as including a first portion 182 extending around the inner surface 187a of bore 186 of lower completion assembly 66b and a second portion 183 extending around the exterior 187b of lower completion assembly 66b. First portion 182 is further formed of a first inner radially extending wall 182a spaced apart from a second inner radially extending wall 182b on opposing sides of WETM 110 so as to form a cavity 189 therebetween. Walls 182a, 182b may take various forms. In one embodiment walls 182a, 182b may be inner lips or protrusions extending partially or fully around the inner surface 187a of bore 186. Likewise, second portion 183 is formed of a first outer radially extending wall 183a spaced apart from a second outer radially extending wall 183b and joined by an additional wall 183c so as to enclose WETM 110. Although not limited in this regard, in the illustrated embodiment, first and second outer radially extending walls 183a, 183b may extend partially or fully around the exterior 187b of tubular 97. Likewise, wall 183c may extend partially or fully around tubular 97.

In FIG. 5, a string 30 is illustrated during advancement into wellbore 12. String 30 may include a WETM 143a and cavity resonator 141 as these components are generally described herein. The junction assembly 92 and the stinger 172 are operatively coupled to string 30 with deflector 94 attached to a distal end of stinger 172 in order to convey deflector 94 for installation and engagement with a latch mechanism 93. Once installed in the well 12, the junction assembly 92 may be configured to provide access to lower main wellbore 12a via primary leg 148 and to the lateral wellbore 12b via secondary leg 150.

The stinger 172 may include a stinger member 176 that is coupled to and extends from the secondary leg 150, a shroud 178 is positioned at a distal end of the stinger member 176, and one or more seal assemblies 170c (see also FIG. 3) are arranged within the shroud 178. Likewise, the shroud 178 may be disposed around third WETM 108c (see also FIG. 3) mounted adjacent seals 170c. In some embodiments, the shroud 178 may be coupled to the deflector 94 with one or more shear pins 180 or a similar mechanical fastener. In other embodiments, the shroud 178 may be coupled to the deflector 94 using other types of mechanical or hydraulic coupling mechanisms.

As previously described, junction assembly 92 includes first, second and third WETMs 108a, 108b and 108c, either internally or externally along conduit 96. Moreover, junction assembly 92 may include a polished bore receptacle 149 at its proximal end 147 (not shown in FIG. 5) with the upper WETM 108a at the proximal end of junction assembly 92 being disposed along the polished bore receptacle 149 of junction assembly 92.

Deflector 94 is conveyed into the wellbore 12 until it engages latch mechanism 93. Once the deflector 94 is properly connected to the latch mechanism 93, the string 30 may be detached from the deflector 94 at the stinger 172 and, more particularly, at the shroud 178. This may be accomplished by placing an axial load on the stinger 172 via the string 30 and shearing the shear pin(s) 180 that connect the stinger 172 to the deflector 94. Once the shear pin(s) 180 fail, the stinger 172 may then be free to move with respect to the deflector 94 as manipulated by axial movement of the string 30. More particularly, with the deflector 94 connected to the latch mechanism 93 and the stinger 172 detached from the deflector 94, the string 30 may be advanced downhole within the wellbore 12 to position secondary leg 150 and the stinger 172 within the lateral wellbore 12b. The diameter of the deflector bore 128 (see FIG. 4) may be smaller than a diameter of the shroud 178, whereby the stinger 172 is prevented from entering the deflector bore 128 but the shroud 178 is instead forced to ride along deflecting surface 124 of deflector 94 and into the lateral wellbore 12b.

In one or more embodiments, any hanger 184 deployed within wellbore 12 may also include a WETM in addition to, or alternatively to, the WETM 108a of junction assembly 92. In FIG. 5, a hanger 184b is illustrated as supporting production casing 54 and including WETM 143b.

Figure 6:
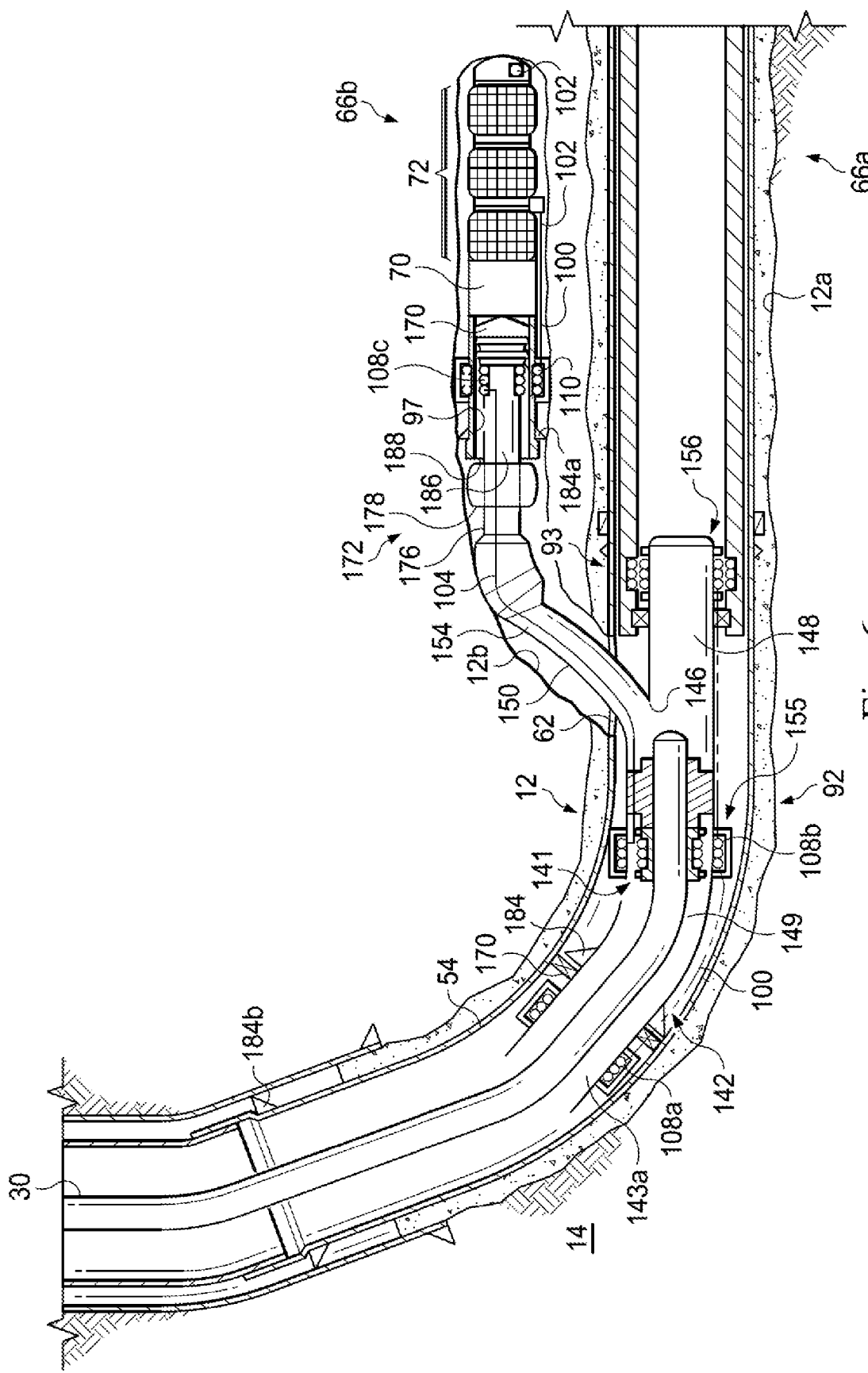
FIG. 6 illustrates cavity resonators deployed in upper and lower completion sections of a wellbore completion system.

Referring to FIG. 6, junction assembly 92 is illustrated once installed in wellbore 12 utilizing string 30 as described above. Deflector 94 (not shown) is engaged with latch mechanism 93. Stinger 172 and the secondary leg 150 of the junction assembly 92 are depicted as positioned in the lateral wellbore 12b and engaging the lower completion assembly 66b of the lateral wellbore 12b. Once these various components have been positioned within wellbore 12 as desired, string 30 may be disengaged and positioned for hydrocarbon recovery. In particular, string 30 may be positioned to sealingly engage the upper section 142 of junction assembly 92 while positioning WETM 143a of string 30 adjacent WETM 108a of junction assembly 92 in order to establish wireless connectivity therebetween. When so positioned, the cavity resonator 141 of string 30 may be generally aligned with the cavity resonator 155 of junction assembly 92 to enhance the wireless connectivity between WETM 143a and WETM 108a.

In any event, during deployment, i.e., transitioning between FIG. 5 and FIG. 6, the shroud 178 of stinger 172 engages the lower completion assembly 66b. In one or more embodiments, the diameter of the shroud 178 may be greater than a diameter of the bore 186 and, as a result, the shroud 178 may be prevented from entering the lower completion assembly 66. Upon engaging the lower completion assembly 66, weight may then be applied to the stinger 172 via the string 30, which may result in the shroud 178 detaching from the distal end of the stinger member 176. In some embodiments, for instance, one or more shear pins or other sharable devices (not shown) may be used to couple the shroud 178 to the distal end of the stinger member 176, and the applied axial load may surpass a shear limit of the shear pins, thereby releasing the shroud 178 from the stinger member 176. It will be appreciated that while a shroud 178 is described herein as a mechanism for protecting seal assemblies 170 and WETM 108c during deployment, the disclosure is not limited to configurations with a shroud 178, and thus, in other embodiments, shroud 178 may be eliminated.

With the shroud 178 released from the stinger member 176, the string 30 may be advanced further such that the shroud 178 slides along the outer surface of the stinger member 176 as the stinger member 176 advances into the lower completion assembly 66 where the stinger seals 170 sealingly engage the inner wall of bore 186 and the third WETM 108c carried on stinger 172 is generally aligned with WETM 110 carried on the lower completion assembly 66. With the stinger seals 170 sealed within bore 186, fluid communication may be facilitated through the lateral wellbore 12b, including through the various components of lower completion assembly 66.

Referring to FIGS. 5 and 6, advancing the string 30 downhole within the wellbore 12 also advances the primary leg 148 until locating and being received within the deflector bore 128. The seal assembly 134 in the deflector bore 128 sealingly engages the outer surface of the primary leg 148 and the second WETM 108b carried on primary leg 148 of junction assembly 92 is positioned adjacent WETM 136 of deflector 94.

When deployed as described herein, the unitary junction assembly 92 permits power and/or data signals to be transmitted to locations in both the lower main wellbore 12a below the intersection 64 (see FIG. 4) and the lateral wellbore 12b. Such an arrangement is particularly desirable because it eliminates the need to overcome multiple separate wellbore components traditionally installed at an intersection 64 between wellbores 12a, 12b.

Figure 8:
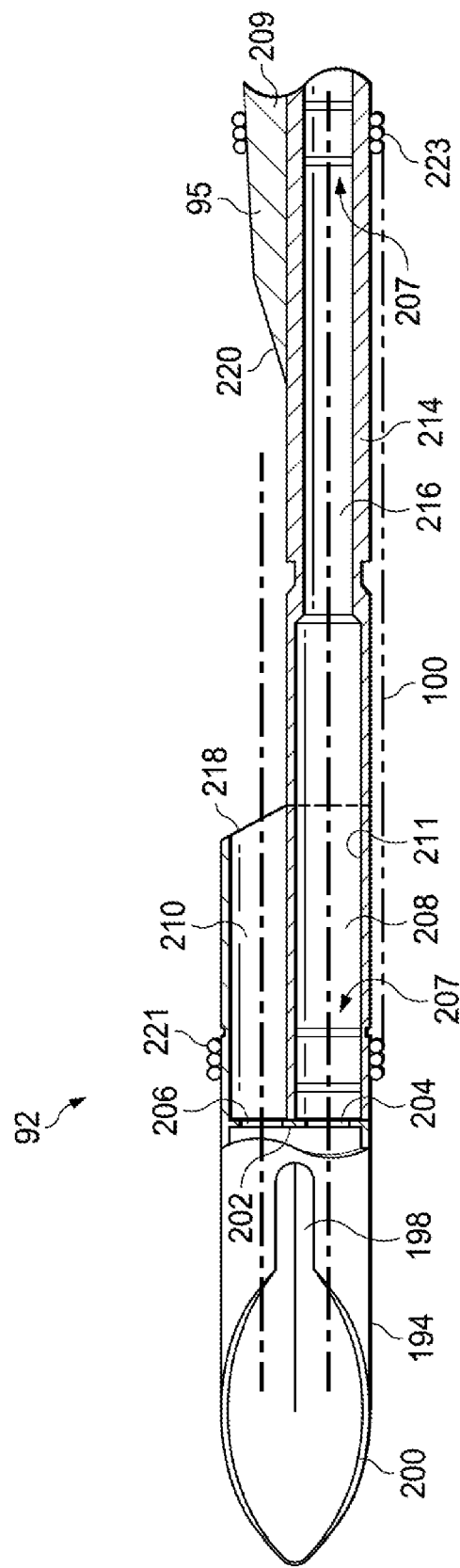
FIG. 8 illustrates cavity resonators on a unitary junction assembly.

Turning to FIGS. 7a, 7b, and 8, another embodiment of junction assembly 92 comprising a rigid conduit 95 is illustrated. In embodiments of junction assembly 92 having a rigid conduit 95, junction assembly 92 is preferably multi-bore. Thus, in the illustrated embodiments, junction assembly 92 takes the form of a dual bore deflector that has dual bores and is secured to and extends upwardly from the latch mechanism 93 shown in FIGS. 1a-1c. Conduit 95 is general characterized as extending along a primary axis or centerline 192 and having a first end 194.

More specifically, conduit 95 may have at its first end 194 a sleeve 198, the upper edge of which may include a guide surface 200. In one or more embodiments, guide surface 200 may be helical in shape. At the lower end of the sleeve 198 is a plate or wall 202 which is generally arranged to be normal to the centerline 192 of conduit 95 so as to form a rigid conduit junction 146. The wall 202 has two adjacent openings 204 and 206 extending through it. The openings 204 and 206 may be offset in opposite directions from the centerline 192, so that the centerline 192 generally extends through a portion of the wall 202 which is disposed between the openings 204 and 206.

The junction assembly 92 has, immediately below the wall 202 forming the rigid conduit junction 146, two adjacent legs or passageways 208 and 210 formed in conduit 95 and extending from wall 202, where each leg or passageway 208, 210 opens into the sleeve 198 through a respective one of the openings 204 and 206. The passageways 208 and 210 are radially offset from the centerline 192, and a wall 212 is provided between them. Leg or passageway 208 may be characterized as a primary leg and is in fluid communication with lower main wellbore 12a when deployed in a wellbore 12 via a first lower opening 209, while leg or passageway 210 may be characterized as a secondary or lateral leg and is in fluid communication with lateral wellbore 12b (see FIGS. 1a-1c) via a second lower opening 218 when deployed in a wellbore 12 and engaged with a latch mechanism 93 (see FIGS. 1a-1c.) The junction assembly 92 also includes an elongate tube 214 defining a passageway 216 that is aligned with and communicates with the passageway 208 so as to extend the length of primary leg or passageway 208.

Elongated tube 214 may be fixedly secured or formed in the conduit 95 so that the centerline of elongated tube 214 is radially offset from the axis 192 of conduit 95. Elongate tube 214, and thus, passageway 216, has a gradual incline or deviation with respect to the primary axis 192, so that the passageway 216 extends downwardly and inwardly toward the primary axis 192.

As set forth above, conduit 95 of the junction assembly 92 has in one side thereof a second lower aperture 218 forming a window, which is vertically and rotationally aligned with the window 62 of casing 54 when junction assembly 92 is secured to latch mechanism 93 (see FIGS. 1a-1c). The conduit 95 has an upwardly facing deflector surface 220 formed along the conduit 95, the deflector surface 220 being spaced apart from, but facing the lower aperture 218 so as to extend upwardly and inwardly relative to the lower edge of the lower aperture 218, preferably at an acute angle with axis 192 so as to define a gradual incline with respect to the primary axis 192. The deflector surface 220 which may be a concave groove that progressively tapers in width and depth in a downward direction. In other embodiments, the groove may have other concave cross-sectional shapes, such as a semicircular cross-sectional shape.

Although junction assembly 92 having a rigid conduit 95 may have the particular configuration as described above, it will be appreciated that the junction assembly 92 of the disclosure, in other embodiments, need not be limited to the particular configuration described above and that the foregoing is for illustrative purposes only.

In any event, for the junction assembly 92 illustrated in FIGS. 7a, 7b, and 8, an upper WETM 221 is carried on conduit 95, preferably positioned along or in the vicinity of passageway 208 of conduit 95, while a lower WETM 223 is carried on conduit 95 at a location spaced apart from upper capacitive coupler 221, such location preferably along or at second end 196 of conduit 95 (see FIG. 7b). One or both of WETMs 221, 223 may be mounted either internally within conduit 95 or along the exterior of conduit 95. A cable 100 may electrically connect the WETMs 221, 223. A cavity resonator may be deployed on any one or more of tubing strings 222 and 224 and junction assembly 92 adjacent a WETM, as shown. Such cavity resonator is not limited to a particular shape or configuration so long as it functions to enhance transmission signals to or from a WETM. Thus, cavity resonator 203 deployed in association with WETM 234 on tubing string 224 is a single radially extending wall 203a positioned adjacent WETM 234, while cavity resonator 205 forms an enclosure around WETM 221 and cavity resonator 207 is comprised of two spaced apart radially extending walls positioned on either side of WETM 230 carried on tubing string 222.

With reference to FIG. 9a and ongoing reference to FIGS. 7a, 7b, and 8, in one or more embodiments, a vector or junction block 226 as shown in FIG. 9a may be positioned upstream of deflector 94 (not shown), either as part of an upper completion assembly 86 (not shown) or separately therefrom. Junction assembly 92 in the form of deflector 94 is disposed for receipt of two tubing strings 222 and 224. In one or more embodiments, tubing strings 222 and 224 may extend down from junction block 226, which may form a part of an upper completion assembly 86 upstream of deflector 94. In one or more embodiments, the tubing strings 222 and 224 may extend from the surface 16 (not shown), directly or through a dual bore packer 88 (not shown).

While in one or more embodiments, a vector or junction block 226 may be positioned upstream of deflector 94 (not shown), either as part of an upper completion assembly 86 (not shown) or separately therefrom, in other embodiments, the junction assembly 92 comprises the vector block 226. In any event, tubing strings 222 and 224 may extend downward from vector or junction block 226. Vector or junction block 226 may be utilized to comingle flow streams from the lateral wellbore 12b and the lower main wellbore 12a (not shown). In one or more embodiments, vector or junction block 226 is formed of a tubular 227 having a first upper aperture 229, a first lower aperture 231 and a second lower aperture 233. In one or more embodiments, a first flowbore 235 through tubular 227 interconnects first upper aperture 229 with first lower aperture 231 and a second flowbore 236 through tubular 227 interconnects first upper aperture 229 with second lower aperture 233 so that flow through the first and second lower apertures 231, 233 is comingled in junction block 226. In other embodiments, junction block 226 includes a second upper aperture 238 as shown in FIG. 9b. In these embodiments, first flowbore 235 interconnects first upper aperture 229 with first lower aperture 231 and second flowbore 236 interconnects second upper aperture 238 with second lower aperture 233 so that flow through the first and second lower apertures 231, 233 remains segregated. String 30 (not shown) from the surface or otherwise upstream of block 226 may be in fluid communication with first upper aperture 229 as shown.

It will be appreciated that junction block 226 as shown in FIG. 9b may include seal assemblies 170 in which case junction block 226 functions as a dual bore packer. Alternatively, junction block 226 may be used in combination with a mono bore packer (such as packer 88 in FIG. 1). Junction block 226 may also be supported in tubing string 222 by a liner hanger or similar mechanism 184 (see FIG. 9a). In any event, the dual bore packer or the junction block 226, as the case may be, is releasably secured within the casing 54 of wellbore 12 (see FIGS. 1a-1c) and resists both upward and downward movement of the tubing string 222, and the tubing string 222 in turn resists upward movement of the junction assembly 92 (see FIGS. 7a and 8).

Each tubing string 222, 224 carries at its distal end a WETM, and may also carry a seal assembly. As illustrated in FIGS. 9a and 9b, WETM 230 is positioned along tubing string 224, preferably at its distal end. A seal assembly 228 may be positioned adjacent the WETM 230. Likewise, tubing string 222 includes an WETM 234 at its distal end with a seal assembly 232 positioned adjacent the WETM 234. In one or more preferred embodiments, one or both seal assemblies 228, 232 may be located upstream of the respective WETMs 230, 234, while in other embodiments, the respective WETMs 230, 234 are positioned between the seal assemblies 228, 232 and the end of the respective tubing string 224, 222. In the case of both WETMs 230, 234, a cable 100 or 104 may extend uphole for direct or indirect communication with the surface 16 (not shown). In a configuration similar to the foregoing, to the extent string 30 communicates with junction block 226, string 30 may also include a WETM 234 and a seal assembly 240.

In any event, as tubing string 222 is engaged with deflector 94 (not shown), and in particular cylindrical passageway 208 (see FIG. 7a), seal assembly 228 sealingly engages a seal bore 211 provided within the upper end 194 of the dual bore deflector 94. The seal bore 211 communicates with elongated tube 214. When tubing string 222 is engaged with seal bore 211 as described, WETM 230 is positioned to form a capacitive coupling with upper WETM 221 carried on conduit 95 as shown in FIG. 7a.

The tubing string 224 (see FIG. 7a) extends past the deflector surface 220 and out into the lateral wellbore 12b (not shown). The seal assembly 232 (see FIG. 7a) sealingly engages the lower completion assembly 66b in the lateral wellbore 12b (see FIG. 6). When tubing string 224 is engaged with lower completion assembly 66b as described herein, WETM 234 (FIG. 7a) is positioned to form a capacitive coupling with WETM 110 (FIG. 6) associated with lower completion assembly 66b.

Elongated tube 214 extends downwardly towards the lower portion of main wellbore 12a (not shown) for engagement, either directly or indirectly via additional tubulars (such as production tubing) and equipment, with lower completion assembly 66a (not shown).

Referring again to FIG. 9a, a cavity resonator as described herein may be deployed on any one or more of tubing strings 30, 222 and 224 and junction block 226 adjacent a WETM, as shown. Such cavity resonator is not limited to a particular shape or configuration so long as it functions to enhance the transmission of E-field signals to or from a WETM. Thus, cavity resonator 203 deployed in association with WETM 234 on tubing string 222 is a single radially extending wall 203a positioned adjacent WETM 234, while cavity resonator 205 forms an enclosure around WETM 242 and cavity resonator 207 is comprised of two spaced apart radially extending walls 207a, 207b positioned on either side of WETM 230, carried on tubing string 224.

Figure 10B:
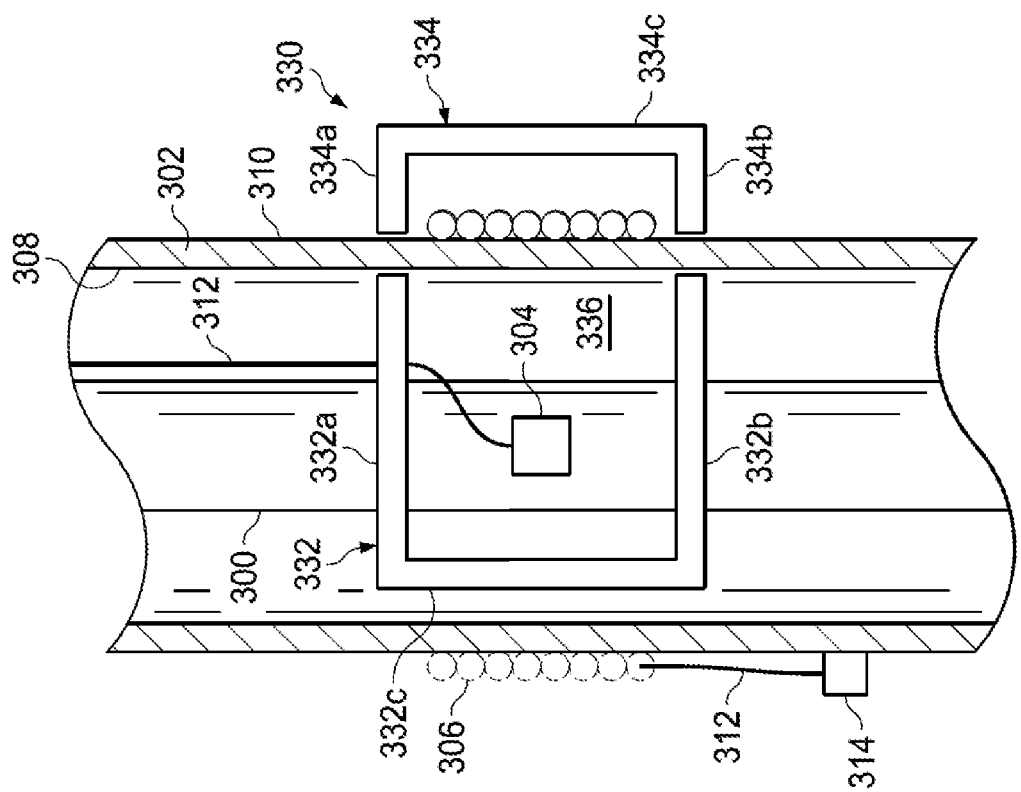
FIGS. 10a-10e illustrate various embodiments of cavity resonators deployed in conjunction with wireless energy transfer mechanisms along tubing strings.
Figure 10A:
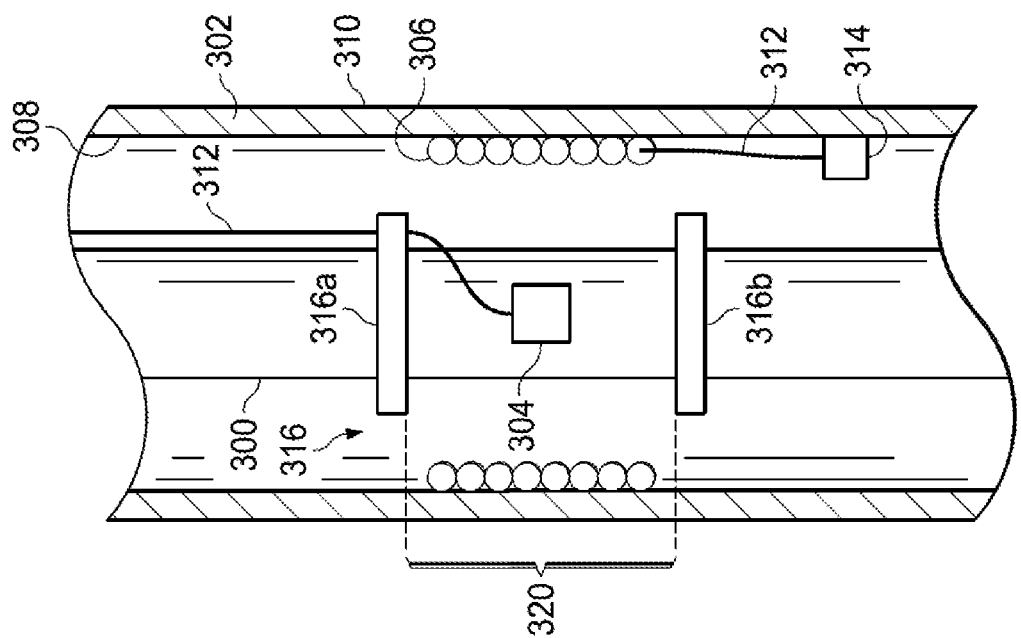

Turning to FIGS. 10a-10e, various embodiments of cavity resonators are shown deployed in conjunction with WETMs along tubing strings. In FIG. 10a, an inner tubular string 300 is illustrated deployed within an outer tubular string 302. Carried on inner tubular string 300 is a WETM 304. Likewise, carried on outer tubular string 302 is a WETM 306. In the illustrated embodiment, WETM 306 is positioned along the inner surface 308 of outer tubular string 302, but in other embodiments, WETM 306 may be positioned along the outer surface 310 of outer tubular string 302. Extending from each WETM 304, 306 is one or more electrical control lines 312. Control lines 312 may operate as communication media, to transmit power, signals or data and the like between a WETM and another electrical devices 314, such as ETMs or other WETMs, sensors or actuators, (micro) processors, logic devices, other flow control valves, digital infrastructure, power sources, optical fiber, Intelligent Inflow Control Devices (ICDs), seismic sensors, vibration inducers and sensors and the like. Deployed in conjunction with at least one WETM is a cavity resonator 316. Cavity resonator 316 is comprised of a first radially extending wall 316a spaced apart from a second radially extending wall 316b on opposing sides of WETM 304 so as for form a cavity 320 therebetween. It will be appreciated that because E-field waves are only constrained from axial propagation by walls 316a, 316b, cavity resonator 316 is omni-directional, permitting E-field propagation radially about the entire circumference of inner tubular string 300.

In FIG. 10b, a cavity resonator 330 is shown and generally includes a first portion 332 carried on inner tubular string 300 and a second portion 334 extending at least partially around the outer surface 310 of outer tubular string 302. First portion 332 is formed of a first inner radially extending wall 332a spaced apart from a second inner radially extending wall 332b and joined by an additional wall 332c so as to enclose WETM 304 within a cavity 336. Second portion 334 is formed of a first outer radially extending wall 334a spaced apart from a second outer radially extending wall 334b and joined by an additional wall 334c so as to at least enclose WETM 306. It will be appreciated that wall 334c constrains the radial propagation of E-field waves, and hence, cavity resonator 300 is uni-directional. In this regard, second portion 334 may extend fully around outer tubular string 302 or only partially. To the extent second portion 334 extends only partially, additional walls, not shown, may enclose the ends of second portion 334.

Figure 10D:
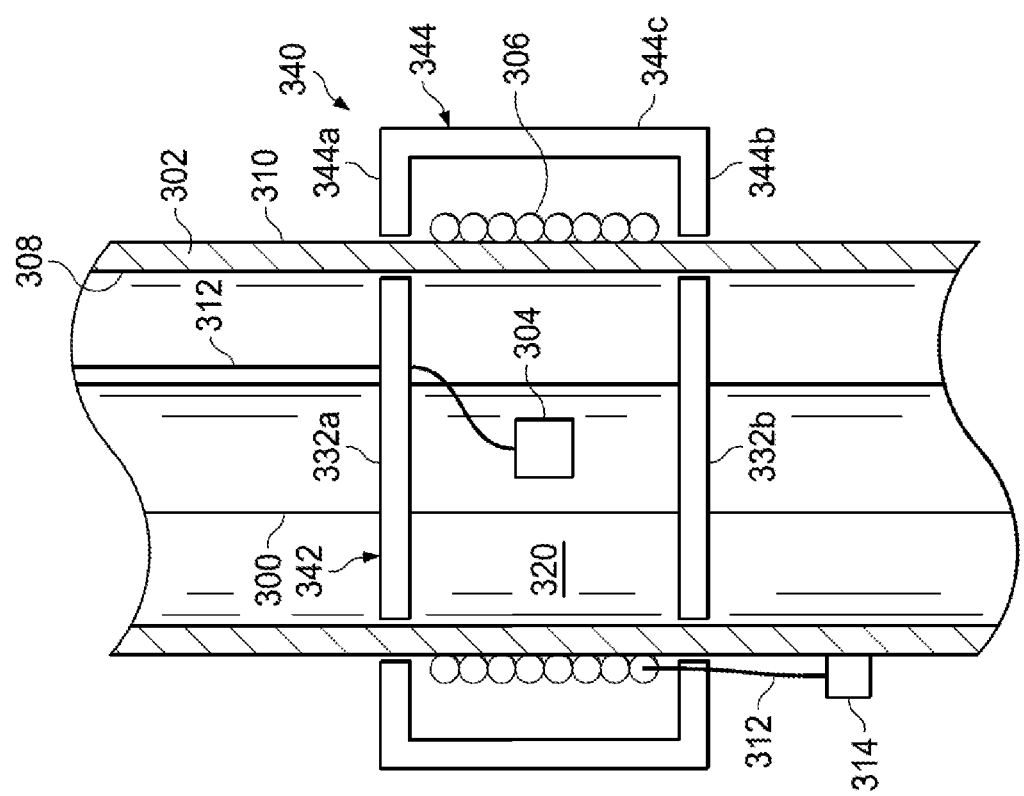
Figure 10C:
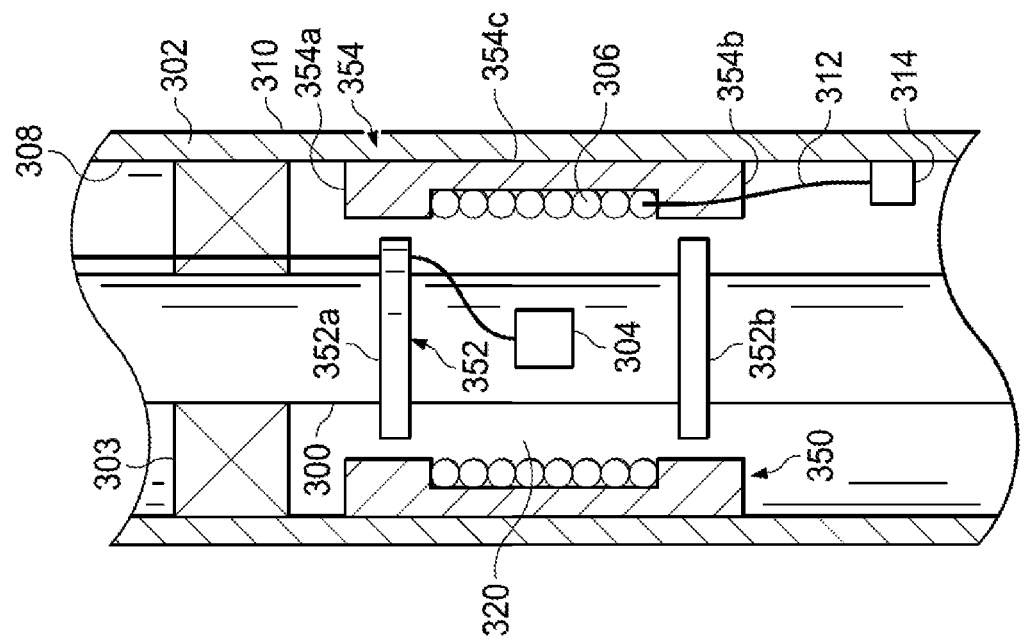

In FIG. 10c, a cavity resonator 340 is shown and generally includes a first portion 342 carried on inner tubular string 300 and a second portion 344 extending at least partially around outer tubular string 302. First portion 342 is formed of a first inner radially extending wall 332a spaced apart from a second inner radially extending wall 332b on opposing sides of WETM 304 so as for form a cavity 320 therebetween. Second portion 344 is formed of a first outer radially extending wall 344a spaced apart from a second outer radially extending wall 344b and joined by an additional wall 344c so as to at least enclose WETM 306. In the illustration, WETM 306 is may be carried on outer tubular string 302 with second portion 344 disposed over WETM 306 and extending fully around outer tubular string 302.

In FIG. 10d, a cavity resonator 350 is shown and generally includes a first portion 352 carried on inner tubular string 300 and a second portion 354 extending at least partially around the inner surface 308 outer tubular string 302. Cavity resonator 350 is shown mounted downstream of sealing elements 303. First portion 352 is formed of a first inner radially extending wall 352a spaced apart from a second inner radially extending wall 352b on opposing sides of WETM 304 so as for form a cavity 320 therebetween. Second portion 354 is formed of a first radially extending wall 354a spaced apart from a second radially extending wall 354b and joined by an additional wall 354c so as to at least enclose WETM 306. In the illustration, second portion 354 extends fully around the inner surface 308 of tubular string 302 and WETM 306 is mounted on second portion 354.

Figure 10E:
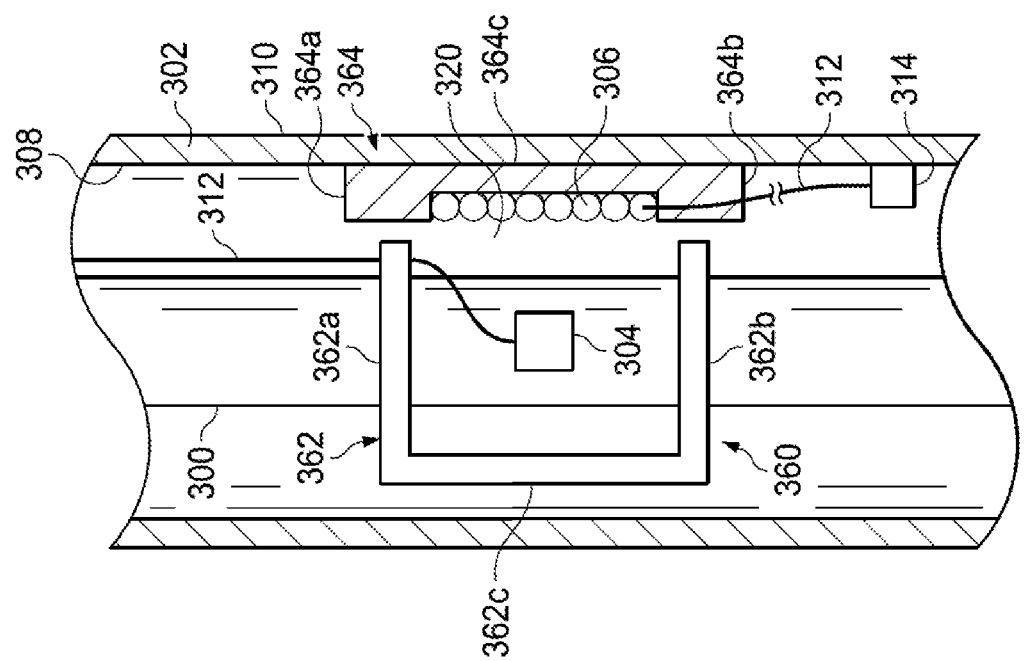

In FIG. 10e, a cavity resonator 360 is shown and generally includes a first portion 362 carried on inner tubular string 300 and a second portion 364 extending at least partially around the inner surface 308 outer tubular string 302. First portion 362 is formed of a first inner radially extending wall 362a spaced apart from a second inner radially extending wall 362b and joined by an additional wall 362c so as to enclose WETM 304 within a cavity 320. It will be appreciated that additional wall 362c forms at least a partial cylinder around inner tubular string 300 and thus, first portion 362 forms at least a partial annulus about WETM 304. In some embodiments, axially extending wall 362c may be partitioned into two sections to form cavity 320. Second portion 364 is formed of a first radially extending wall 364a spaced apart from a second radially extending wall 364b and joined by an additional wall 364c so as to at least enclose WETM 306. Wall 364c may be shaped to cooperate with the inner surface 308 of outer tubular string 302. In the illustration, second portion 364 extends at least partially about the inner surface 308 of tubular string 302 and WETM 306 is mounted on second portion 364.

Figure 11A:
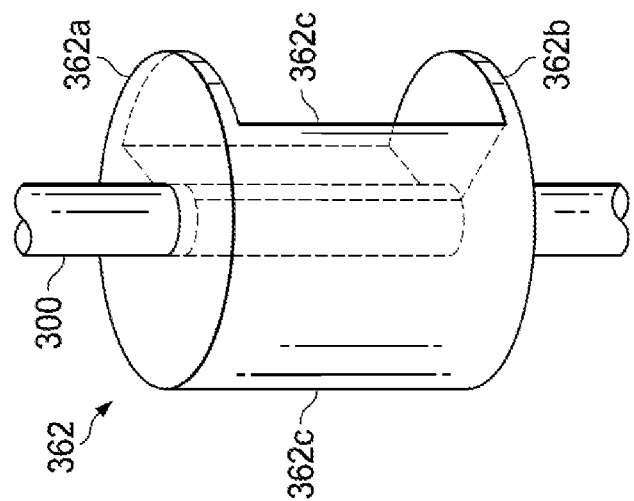
FIG. 11a illustrates a unidirectional cavity resonators deployed along a tubing string.
Figure 11B:
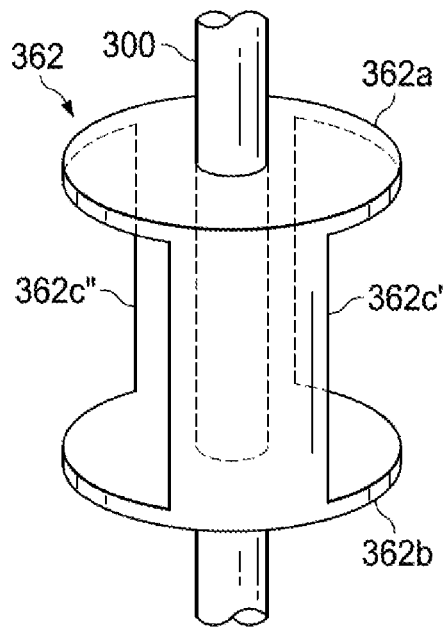
FIG. 11b illustrates an omni-directional cavity resonators deployed along a tubing string.
Figure 12:
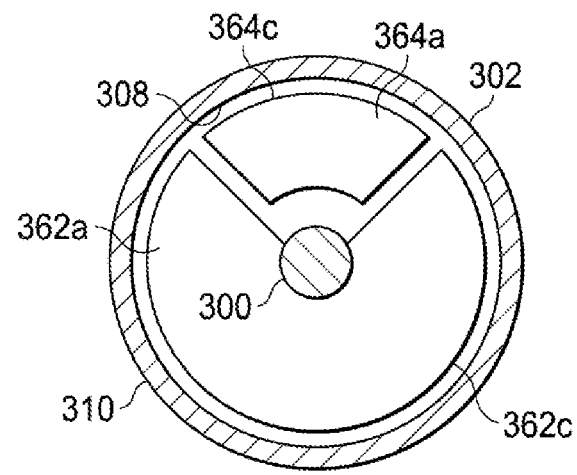
FIG. 12 illustrates an axial view of unidirectional cavity resonators aligned on tubing strings in a wellbore.

In FIG. 11a, wall 362c of the first portion 362 of cavity resonator 360 of FIG. 10e is illustrated as extending around a substantial portion of the circumference of inner tubular string 300, while in FIG. 11b, first portion 362 is illustrated having two axially extending walls 362c' and 362c". In FIG. 12, an axial view of the cavity resonator 360 of FIG. 10e is shown, where an inner tubular string 300 having a cavity resonator 362a is deployed within an outer tubular string 302 having a cavity resonator 364a.

It should be appreciated that unless specifically limited in a particular embodiment, in all embodiments of the cavity resonators described herein may be of various shapes so long as they function to enhance the energy transfer between WETMs by focusing the E-field from the WETMs in a particular direction. Similarly, unless specifically limited in a particular embodiment, each ETM, whether wireless or not, may be positioned above or below a sealing mechanism, as desired for a particular deployment. Thus, for example, along any given tubular, a capacitive coupler coil may be positioned along an inner bore or surface of the tubular or along an outer surface of the tubular or may pass through the tubular wall between the interior and the exterior. The coil may be located adjacent a sealing mechanism positioned along an inner bore or surface of the tubular or along an outer surface of the tubular. The coil may be located adjacent the end of the tubular or along the body of the tubular. The coil may be located above or below (upstream or downstream) a sealing mechanism. Similarly, unless specifically limited in a particular embodiment, cabling extending between wireless energy transfer mechanisms may run along the interior of the tubular or along the exterior of the tubular or may pass through the tubular wall between the interior and the exterior.

Figure 13:
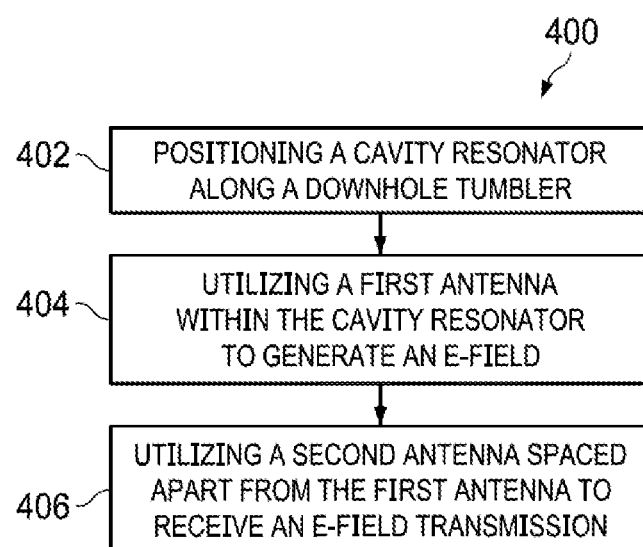
FIG. 13 is a schematic diagram of a method for wirelessly transmitting between wellbore components utilizing cavity resonators.

In FIG. 13, a method 400 for wirelessly transmitting between wellbore components is illustrated. In a first step 402 of method 400 a cavity resonator is positioned along a downhole tubular. The cavity resonator may take the shape and/or form of the cavity resonators 316, 330, 340, 350, or 360 described above with respect to FIGS. 10a-10e. In a second step 404, a first antenna, such as antenna 304 from FIGS. 10a-10e, and preferably positioned at least partially within the cavity resonator, is utilized to generate an E-field. The first antenna may be electrically coupled to a power source.

In step 406, a second antenna, such as antenna 306 from FIGS. 10a-10e, and preferably positioned spaced apart but in the vicinity of the first antenna, is utilized to receive an E-field transmission. The second antenna may be electrically wired to an electrical device requiring power, such as electrical device 314 described above. In one or more embodiments, the second antenna is positioned within the cavity. In one or more embodiments, the E-field transmission is further enhanced by positioning a cavity resonator about the second antenna. In one or more embodiments, the method may include conveying power between wellbore components using the E-field transmission, while in other embodiments, the method may include conveying data between wellbore components using the E-field transmission. In yet other embodiments, the method may include conveying control signals between wellbore components using the E-field transmission. Without limiting the foregoing, in certain embodiments, the wellbore components may be selected from the group consisting of ETMs or other WETMs, sensors or actuators, (micro) processors, logic devices, other flow control valves, digital infrastructure, power sources, optical fiber, Intelligent Inflow Control Devices (ICDs), seismic sensors, vibration inducers and sensors and the like, at least one of which is disposed in the wellbore.

In one or more steps, the E-field transmission within the resonant cavity may be further enhanced by tuning the E-field transmission based on the resonance of the resonant cavity to wave to enhance.

In one or more embodiments, the E-field transmission of method 400 is utilized to establish a radiative communication between antennas.

In one or more embodiments, the E-field transmission of method 400 is utilized to establish a capacitive coupling between the antennas.

Thereafter, parameters in a lateral wellbore can be monitored from the surface utilizing the E-field transmission. Similarly, parameters in a lateral wellbore can be gathered utilizing the E-field transmission. Similarly, parameters in a lateral wellbore can be transmitted utilizing the E-field transmission. These transmissions utilizing the E-field may be between a lateral wellbore and a main wellbore, such as transmitting between a primary leg of a junction assembly and a deflector in a main wellbore utilizing the E-field transmission. Likewise, the E-field transmission may be utilized to transmit parameters between one device in a lateral wellbore and another device in a lateral wellbore, or between a device in a lateral wellbore and two or more devices in a main wellbore. In one or more embodiments, multiple cavity resonators may be positioned along a downhole tubular and utilizing each cavity resonator to transmit via an E-field generated within each cavity. This may include positioning the cavity resonator on production tubing below the Y-block of a junction assembly; or positioning the cavity resonator on production tubing above the Y-block of a junction assembly; or positioning the cavity resonator on the Y-block of a junction assembly. These E-field transmission may be utilized to convey power, or to convey control signals or to convey data.

Thus, a multilateral wellbore system utilizing cavity resonators to enhance E-field transmissions has been described. A multilateral wellbore system may generally include a unitary junction assembly having a conduit having a first upper aperture, a first lower aperture and a second lower aperture; the first lower aperture defined at a distal end of a primary leg extending from a conduit junction; the second lower aperture defined at a distal end of a lateral leg extending from the conduit junction; an upper energy transfer mechanism mounted along the conduit between the distal end of the lateral leg and the first upper aperture; a lower wireless energy transfer mechanism mounted on one of the legs between the distal end of the leg and the upper wireless energy transfer mechanism; and a cavity resonator at least partially enclosing the wireless energy transfer mechanism. In other embodiments, a multilateral wellbore system may generally include a junction assembly having a conduit with a first upper aperture, a first lower aperture and a second lower aperture; the first lower aperture defined at a distal end of a primary leg extending from a conduit junction; the second lower aperture defined at a distal end of a lateral leg extending from the conduit junction; the conduit further including an upwardly facing deflector surface formed along the conduit and opposing, but spaced apart from the second lower aperture; an upper energy transfer mechanism mounted along the conduit; a lower wireless energy transfer mechanism mounted on one of the legs of the junction assembly between the upper energy transfer mechanism and a lower aperture; and a cavity resonator at least partially enclosing the wireless energy transfer mechanism. In still yet other embodiments, a multilateral wellbore system may generally include a unitary junction assembly having a conduit having a first upper aperture, a first lower aperture and a second lower aperture; the first lower aperture defined at a distal end of a primary leg extending from a conduit junction; the second lower aperture defined at a distal end of a lateral leg extending from the conduit junction, where at least one of the legs of the junction assembly is deformable; a first wireless energy transfer mechanism mounted on the lateral leg of the junction assembly; a second wireless energy transfer mechanism mounted on the primary leg of the junction assembly; and a cavity resonator at least partially enclosing at least one wireless energy transfer mechanism. In other embodiments, a multilateral wellbore system may generally include a unitary junction assembly having a conduit having a first upper aperture, a first lower aperture and a second lower aperture; the first lower aperture defined at a distal end of a primary leg extending from a deformable conduit junction; the second lower aperture defined at a distal end of a lateral leg extending from the deformable conduit junction; a wireless energy transfer mechanism mounted on the lateral leg of the junction assembly; an energy transfer mechanism mounted on the conduit between the first upper aperture and the deformable conduit junction; and a cavity resonator at least partially enclosing the wireless energy transfer mechanism.

For any of the foregoing, the multilateral wellbore system may include any one of the following elements, alone or in combination with each other:

each of the wireless energy transfer mechanisms is an WETM.

a wireless energy transfer mechanism mounted on each leg.

at least one of the legs of the junction assembly is deformable.

a completion deflector having an energy transfer mechanism mounted thereon, the completion deflector comprising a tubular formed along a primary axis and having a first end and a second end, with a contoured surface provided at the first end, the tubular further having an inner bore extending between the two ends with a seal assembly along the inner bore, the first end and the inner bore disposed for receipt of the primary leg of the junction assembly.

the energy transfer mechanism of the completion deflector is mounted in the bore between the first end and the seal assembly.

a lateral completion assembly, the lateral completion assembly comprising an energy transfer mechanism mounted thereon.

the lateral completion assembly further comprises an inner bore extending between a first end and a second end, with the energy transfer mechanism mounted about the inner bore and a seal assembly along the inner bore between the energy transfer mechanism and the second end.

the lateral completion assembly comprises a packer and the inner bore is formed in a mandrel of the packer.

the lateral completion assembly comprises a packer and a polished bore receptacle in fluid communication with the packer, and the inner bore is formed in the polished bore receptacle.

a first tubing string having a distal end with a wireless energy transfer mechanism disposed on the first tubing string adjacent the distal end, wherein the first tubing string extends into the first upper aperture of the junction assembly and through the lateral leg and seats in the lateral completion assembly so that the wireless energy transfer mechanism carried on the first tubing string is wirelessly coupled to the wireless energy transfer mechanism of the lateral completion assembly.

a second tubing string having a distal end with a wireless energy transfer mechanism disposed on the second tubing string, wherein the second tubing string extends into the second upper aperture of the junction assembly so that the wireless energy transfer mechanism carried on the second tubing string is wirelessly coupled to the upper wireless energy transfer mechanism of the junction assembly.

an electrical device in wired communication with a energy transfer mechanism of the lateral completion assembly, the electrical device selected from the group consisting of sensors, flow control valves, controllers and actuators.

the electrical device selected from the group consisting of sensors, actuators, computers, (micro) processors, logic devices, flow control valves, valves, digital infrastructure, optical fiber, Intelligent Inflow Control Devices (ICDs), seismic sensors, vibration inducers and vibration sensors.

the energy transfer mechanism comprises a capacitive coupler coil.

the energy transfer mechanisms comprises an WETM.

the lateral leg is defined along an axis, the system further comprising a deflector surface formed along the lateral leg axis and opposing, but spaced apart from the second lower aperture.

a first tubing string having a distal end with a wireless energy transfer mechanism disposed on the first tubing string, wherein the first tubing string extends through a portion of the junction assembly and protrudes from the second lower aperture of the second lateral leg; and a second tubing string having a distal end with a wireless energy transfer mechanism disposed on the second tubing string, wherein the second tubing string extends into the first upper aperture of the junction assembly so that the wireless energy transfer mechanism carried on the second tubing string is wirelessly coupled to both of the wireless energy transfer mechanisms of the junction assembly.

a lateral completion assembly, the lateral completion assembly comprising an energy transfer mechanism mounted thereon.

the lateral completion assembly further comprises an inner bore extending between a first end and a second end, with the energy transfer mechanism mounted about the inner bore and a seal assembly along the inner bore between the energy transfer mechanism and the second end, wherein the first tubing string extends into the first upper aperture of the junction assembly so that the wireless energy transfer mechanism carried on the first tubing string is wirelessly coupled to the wireless energy transfer mechanism of the lateral completion assembly.

the lateral completion assembly comprises a packer and the inner bore is formed in a mandrel of the packer.

the lateral completion assembly comprises a packer and a polished bore receptacle in fluid communication with the packer, and the inner bore is formed in the polished bore receptacle.

an electrical device in wired communication with an energy transfer mechanism of the lateral completion assembly, the electrical device selected from the group consisting of sensors, valves, controllers and actuators.

the upper wireless energy transfer mechanism mounted adjacent the first upper aperture is carried on the conduit between the first upper aperture and the conduit junction.

the upper wireless energy transfer mechanism mounted adjacent the first upper aperture is carried on a liner hanger upstream of the first upper aperture.

the upper wireless energy transfer mechanism mounted adjacent the first upper aperture is carried on a polished bore receptacle upstream of the first upper aperture.

the lateral completion assembly further comprises an inner bore extending between a first end and a second end, with the energy transfer mechanism mounted along the inner bore, the first end and the inner bore disposed for receipt of the lateral leg of the junction assembly.

a seal assembly mounted along the inner bore of the lateral completion assembly, between the energy transfer mechanism and the second end of the inner bore.

the seal assembly comprises an elastomeric seal.

the seal assembly comprises a sealing surface.

a completion deflector having an energy transfer mechanism mounted thereon, the completion deflector comprising a tubular formed along a primary axis and having a first end and a second end, with a contoured surface provided at the first end, the tubular further having an inner bore extending between the two ends, the first end and the inner bore disposed for receipt of the primary leg of the junction assembly.

the energy transfer mechanism of the completion deflector is mounted in the bore between the first end and the second end.

the lateral leg comprises a lateral stinger having a stinger member, one or more stinger seals positioned adjacent the energy transfer mechanism and a shroud arranged about the energy transfer mechanism and seal.

a completion deflector having an energy transfer mechanism mounted thereon, the completion deflector comprising a tubular formed along a primary axis and having a first end and a second end, with a contoured surface provided at the first end, the tubular further having an inner bore extending between the two ends with a sealable surface formed within the inner bore, the first end and the inner bore disposed for receipt of the primary leg of the junction assembly, wherein the energy transfer mechanism of the completion deflector is mounted in the bore between the first end and the seal assembly.

the unitary junction assembly is selected from the group consisting of a dual bore deflector; a vector block; a deformable junction; a dual packer; a vector block and monobore packer combination; and a flexible junction and liner hanger combination.

Although various embodiments and methodologies have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A multilateral wellbore system comprising:
  a unitary junction assembly having a conduit with a first upper aperture, a first lower aperture and a second lower aperture; the first lower aperture defined at a distal end of a primary passageway formed by the conduit and extending from a conduit junction defined along the conduit; the second lower aperture defined at a distal end of a lateral passageway formed by the conduit and extending from the conduit junction;
  an upper energy transfer mechanism (ETM) mounted along the conduit between the first upper aperture and the conduit junction;
  a first lower wireless energy transfer mechanism (WETM) mounted along one of the passageways between the distal end of the passageway and the upper ETM, the upper ETM in wired communication with the first lower WETM; and
  a first lower cavity resonator, the first lower cavity resonator having a cavity formed therein with the first lower WETM at least partially disposed within the cavity;
  a first tubing string having a distal end with a WETM disposed thereon and a cavity resonator positioned along the first tubing string, the first tubing string cavity resonator having a cavity formed therein with the first tubing string WETM at least partially disposed within the cavity, wherein the first tubing string extends through a portion of the junction assembly and protrudes from the second lower aperture of the lateral passage and engages a lateral completion assembly having a WETM and a cavity resonator mounted thereon with the lateral completion assembly WETM at least partially disposed in the cavity of the lateral completion assembly cavity resonator, the first tubing string engaging a lateral completion assembly so that the first tubing string WETM carried thereon is wirelessly coupled to the WETM of the lateral completion assembly; and
  a second tubing string having a distal end with a WETM disposed thereon and a cavity resonator positioned along the second tubing string, wherein the second tubing string extends into the first upper aperture of the junction assembly so that the WETM carried on the second tubing string is wirelessly coupled to the upper ETM of the junction assembly.

2. The system of claim 1, wherein the unitary junction assembly is selected from a group consisting of a dual bore deflector; a vector block; a deformable junction; a dual packer; a vector block and monobore packer combination; and a flexible junction and liner hanger combination.

3. The system of claim 1, wherein the first lower WETM is an electric-field antenna.

4. The system of claim 1, wherein the first lower cavity resonator comprises a first end wall and a second end wall spaced apart from one another along a tubular axis defined by the conduit to define the cavity therebetween.

5. The system of claim 4, further comprising an outer cavity wall extending between the first end wall and the second end wall and at least partially bounding the cavity.

6. The system of claim 1, wherein each passageway comprises a leg and at least one of the legs of the junction assembly is deformable.

7. The system of claim 1, wherein the first lower WETM is mounted along the primary passageway and wherein the system further comprises a second lower WETM mounted along the lateral passageway and wherein the second lower WETM is positioned at least partially within a cavity of a second lower cavity resonator.

8. The system of claim 1, wherein the upper ETM is an upper WETM with a cavity resonator positioned along the conduit adjacent the upper WETM, the cavity resonator having a cavity formed therein with the upper WETM at least partially disposed within the cavity.

9. The system of claim 8, further comprising the second tubing string cavity resonator having a cavity formed therein with the second tubing string WETM at least partially disposed within the cavity, the second tubing string engaging the unitary junction assembly so that the respective cavity resonator of the second tubing string is adjacent the cavity resonator associated with the upper WETM of the unitary junction assembly.

10. The system of claim 1, wherein the first lower cavity resonator comprises a first resonator portion and a second resonator portion adjacent the first resonator portion so as to define the cavity, wherein the lower WETM is disposed at least partially within one of the resonator portions.

11. The system of claim 1, further comprising an electrical device in wired communication with the WETM of the lateral completion assembly, the electrical device selected from a group consisting of sensors, flow control valves, controllers, WETMs, ETMs, contact electrical connectors, electrical power storage device, computer memory, and logic devices.

12. A multilateral wellbore system comprising:
a junction assembly having a conduit with a first upper aperture, a first lower aperture and a second lower aperture; the first lower aperture defined at a distal end of a primary passageway formed by the conduit and extending from a conduit junction defined along the conduit; the second lower aperture defined at a distal end of a lateral passageway formed by the conduit and extending from the conduit junction; the conduit further including an upwardly facing deflector surface formed along the conduit and opposing, but spaced apart from the second lower aperture;
an upper energy transfer mechanism (ETM) mounted along the conduit;
a lower wireless energy transfer mechanism (WETM) mounted along the primary passageway of the junction assembly between the upper energy transfer mechanism and the first lower aperture, the upper ETM in wired communication with the lower WETM;
a lower cavity resonator mounted along the primary passageway, the lower cavity resonator having a cavity formed therein with the lower WETM at least partially disposed within the cavity;
a first tubing string having a distal end with a WETM disposed thereon and a cavity resonator positioned along the first tubing string, the first tubing string cavity resonator having a cavity formed therein with the first tubing string WETM at least partially disposed within the cavity, wherein the first tubing string extends through a portion of the junction assembly and protrudes from the second lower aperture of the lateral passage and engages a lateral completion assembly having a WETM and a cavity resonator mounted thereon with the lateral completion assembly WETM at least partially disposed in a cavity of the lateral completion assembly cavity resonator, the first tubing string engaging the lateral completion assembly so that the first tubing string WETM carried thereon is wirelessly coupled to the WETM of the lateral completion assembly; and
a second tubing string having a distal end with a WETM disposed thereon and a cavity resonator positioned along the second tubing string, wherein the second tubing string extends into the first upper aperture of the junction assembly so that the WETM carried on the second tubing string is wirelessly coupled to the upper ETM of the junction assembly.

13. The system of claim 12, wherein the lower WETM is an electric-field antenna.

14. The system of claim 12, wherein the lower cavity resonator comprises a first end wall and a second end wall spaced apart from one another along a tubular axis defined by the conduit to define the cavity therebetween.

15. The system of claim 14, further comprising an outer cavity wall extending between the first end wall and the second end wall and at least partially bounding the cavity.

16. The system of claim 12, further comprising an electrical device in wired communication with a WETM of at least the lateral completion assembly or the junction assembly, the electrical device selected from a group consisting of sensors, flow control valves, controllers, WETMs, ETMs, contact electrical connectors, electrical power storage device, computer memory, and logic devices.

17. The system of claim 12, wherein the junction assembly includes the upwardly facing deflector surface formed on an exterior of the conduit.

18. A method of wirelessly transmitting between wellbore components, the method comprising:
positioning a lower cavity resonator along a unitary junction assembly selected from a group consisting of a dual bore deflector; a vector block; a deformable junction; a dual packer; a vector block and monobore packer combination; and a flexible junction and liner hanger combination;
positioning an upper energy transfer mechanism (ETM) on the unitary junction assembly above the lower cavity resonator;
positioning a first antenna within the lower cavity resonator in wired communication with the upper ETM;
positioning a first tubing string through at least a portion of the unitary junction assembly and protruding from a lower aperture, the first tubing string having a distal end with a WETM disposed thereon and a cavity resonator positioned along the first tubing string, the first tubing string cavity resonator having a cavity formed therein with the first tubing string WETM at least partially disposed within the cavity,
engaging a lateral completion assembly with the first tubing string so that the first tubing string WETM is wirelessly coupled to a second antenna on the lateral completion assembly, the lateral completion assembly having a cavity resonator mounted thereon with the second antenna at least partially disposed in a cavity of the lateral completion assembly cavity resonator;
extending a second tubing string into an upper aperture of the unitary junction assembly so that a WETM carried on a distal end of the second tubing string is wirelessly coupled to the upper ETM on the unitary junction assembly;
utilizing the first antenna within the lower cavity resonator to generate an electric-field transmission; and
utilizing the second antenna spaced apart from the first antenna to receive the electric-field transmission.

19. The method of claim 18, further comprising, focusing the electric-field transmission utilizing the lower cavity resonator; and utilizing the electric-field transmission to convey at least one of power, data or control signals between the wellbore components.

20. The method of claim 19, wherein focusing the electric-field transmission includes focusing the electric field transmission in a radial direction.

* * * * *